United States Patent
Nakahara

(10) Patent No.: US 8,014,030 B2
(45) Date of Patent: Sep. 6, 2011

(54) IMAGE PROCESSING AND FORMATION WITH LINE THININNG BY REDUCING INTENSITY OF TARGET PIXEL BASED ON EXTRACTED CONTOUR PIXEL AND AREA CONNECTEDNESS INFORMATION

(75) Inventor: Nobuhiko Nakahara, Susono (JP)

(73) Assignees: Kabushiki Kaisha Toshiba, Tokyo (JP); Toshiba Tec Kabushiki Kaisha, Tokyo (JP)

( * ) Notice: Subject to any disclaimer, the term of this patent is extended or adjusted under 35 U.S.C. 154(b) by 554 days.

(21) Appl. No.: 12/207,760

(22) Filed: Sep. 10, 2008

(65) Prior Publication Data

US 2009/0073468 A1 Mar. 19, 2009

Related U.S. Application Data

(60) Provisional application No. 60/972,470, filed on Sep. 14, 2007.

(51) Int. Cl.
*H04N 1/387* (2006.01)
*H04N 1/409* (2006.01)
*G06T 5/00* (2006.01)
*G06T 5/20* (2006.01)
*G06K 9/44* (2006.01)
*G06K 15/00* (2006.01)

(52) U.S. Cl. .......... 358/1.9; 358/1.2; 358/1.7; 358/3.24; 358/3.27; 382/258; 382/261; 382/266

(58) Field of Classification Search .................... 358/1.2, 358/1.7, 1.9, 3.06, 3.21, 3.23, 3.24, 3.27, 358/448, 300; 382/199, 205, 254, 258, 260, 382/261, 264, 266, 267, 274; 347/131, 132, 347/135, 144, 247, 251–254
See application file for complete search history.

(56) References Cited

U.S. PATENT DOCUMENTS

| 5,465,157 A | 11/1995 | Seto et al. |
| 5,666,213 A | 9/1997 | Ohshita et al. |
| 7,834,917 B2 * | 11/2010 | Kinoshita et al. ............. 382/262 |
| 2007/0196031 A1 * | 8/2007 | Chen et al. .................... 382/278 |

FOREIGN PATENT DOCUMENTS

JP 3015119 12/1999

* cited by examiner

*Primary Examiner* — Scott A Rogers
(74) *Attorney, Agent, or Firm* — Turocy & Watson, LLP

(57) ABSTRACT

An image processing apparatus includes a contour pixel extraction unit configured to extract a contour pixel component from a bit plane. The bit plane is a set of bits, the number of which is equal to the number of pixels, and each of which is 1 bit of a plurality of bits representing an intensity of each of pixels. Also provided is a connectedness detection unit configured to detect equivalent bits adjacent to each other in a window including a bit corresponding to a target pixel on the bit plane. Also provided is a filter unit configured to reduce an intensity of the target pixel by a reduction amount determined in accordance with the contour pixel component extracted by the contour pixel extraction unit and the equivalent bits adjacent to each other detected by the connectedness detection unit.

20 Claims, 19 Drawing Sheets

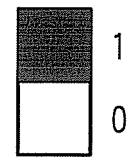
FIG. 10A
FIG. 10B
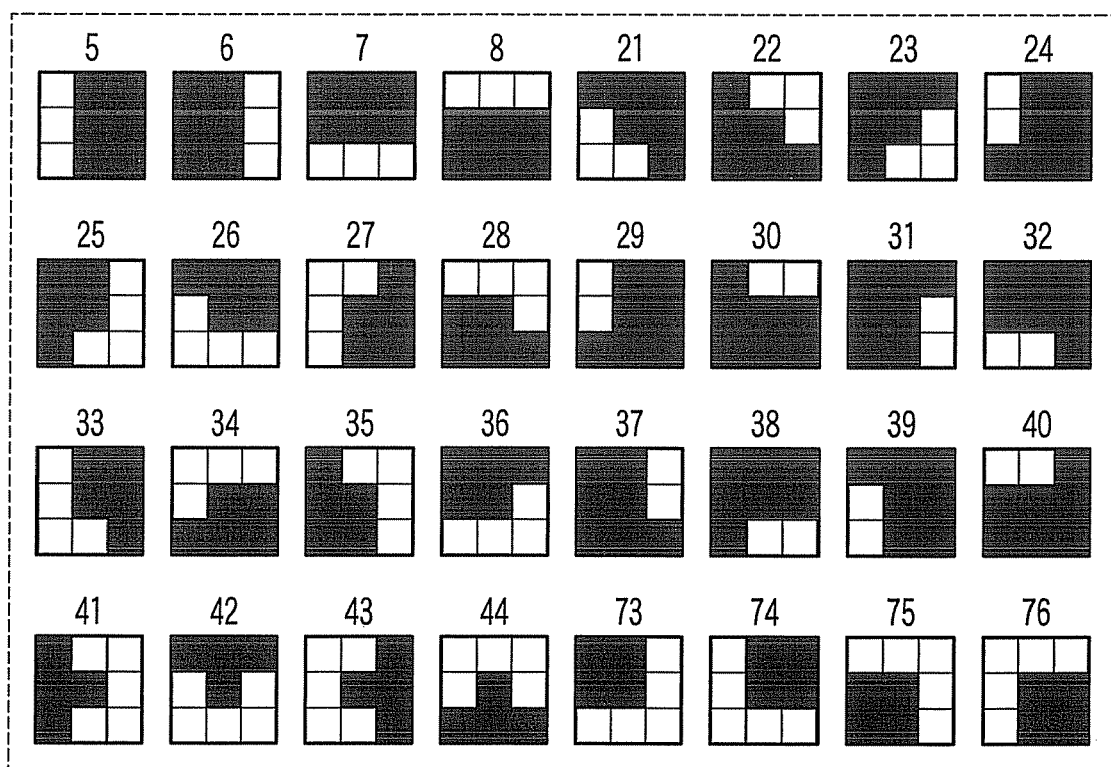
FIG. 10C

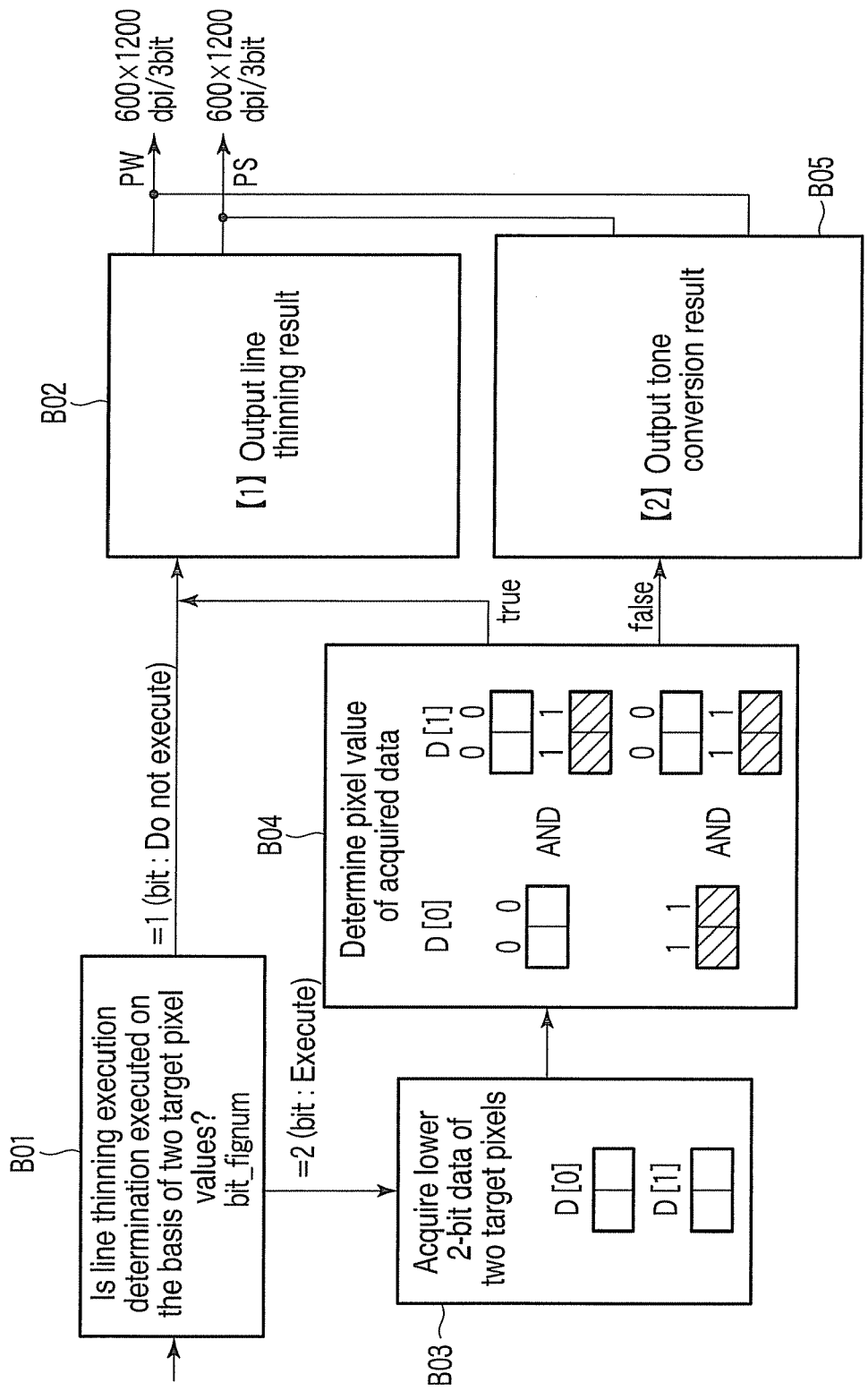
F I G. 18

Pulse position after conversion : PS3 if(PS1==P_RIGHT && PS2==P_LEFT) PS3=P_CENTER  (PS1 : Right side, PS2 : Left side → PS3 : Center)
else if(PS2==P_LEFT && PW1==255) PS3=P_LEFT  (PS2 : Left side, PW1 : 255 → PS3 : Right side)
else if(PS1==P_RIGHT && PW2==255) PS3=P_RIGHT  (PS1 : Right side, PW2 : 255 → PS3 : Right side)
else if(PW3==255 || PW3==0) PS3=P_LEFT  (PW : 255 , PW3 : 0 → PS3 : Left side)
else PS3=PSD(PWSUM, PSmode, PW1, PW2, PS1, PS2)

F I G. 21

IMAGE PROCESSING AND FORMATION WITH LINE THININNG BY REDUCING INTENSITY OF TARGET PIXEL BASED ON EXTRACTED CONTOUR PIXEL AND AREA CONNECTEDNESS INFORMATION

CROSS-REFERENCE TO RELATED APPLICATION

This application is based upon and claims the benefit of U.S. Provisional Application No. 60/972,470, filed Sep. 14, 2007.

TECHNICAL FIELD

The present invention relates to an image processing apparatus, an image processing method, and an image forming apparatus for processing a halftoned image.

BACKGROUND

Recently, various image forming apparatuses such as an MFP (Multi Function Peripheral) using an electrophotographic process system have come into widespread use, and typically, a laser printer for reproducing tone by driving laser on the basis of a digitized image data and the like are given. Furthermore, image forming apparatuses such as a color printer for reproducing a color image by repeating the process mentioned above for each of three or four colors or by performing tandem process have spread rapidly.

In such image forming apparatuses, a record area of toner is decreased by shaping a contour part of an image to be thin, and thus it is possible to reduce consumption of ink. Therefore, for the purpose of saving the toner, there has been developed a line thinning technique of, for example, performing pattern replacement or determining a contour pixel as a sample point and forming the contour on the inner side by interpolation.

However, such a technique is mainly based on a character type document. Hence, when this technique is applied to an image in which characters and photos both exist, the problem such as deterioration of the tone reproduction arises. The reason is that a pseudo contour or the like occurs when the photo area is n-valued by a toning method such as a dithering and the contour of halftone dots representing a photo is cut off.

Accordingly, there has been developed a technique of performing a line thinning only on thick lines or solid parts by separating character areas and photo areas, thin lines and the thick lines, or isolated points and the solid parts.

On the other hand, recently, resolution of these image forming apparatuses has increased, and image forming apparatuses having a high resolution, for example, 1200 dpi have been embodied. Alternatively, in order to increase image quality and resolution, a multi-level PWM technique has been employed increasingly to reproduce images by performing a multi-level toning on one pixel.

Furthermore, by setting a high resolution in a RIP processing for converting font and graphic data into raster data having a relationship with positions of an actual output image, it is possible to achieve high image quality and high precision. For example, a contour part forming an image of 1200 dpi is smoother than that of 600 dpi. Image reproduction quality of detailed parts of an image is improved also on the basis of a sampling theorem. In addition, since the generated fonts and graphic data is smooth, in such a line thinning, high resolution in an output device enables more precise 2-dimensional control, thereby acquiring higher quality output as a result.

However, the known line thinning is generally performed on a binary image, and thus it is hard to perform the line thinning on an image which is processed by a multi-level toning to increase precision and image quality. The reason is that the image processed by the line thinning does not correspond to the multi-level halftoned image.

Meanwhile, when resolution of an image forming apparatus increases, for example, when the identical speed is achieved with the identical number of beams, an image clock speed extremely increases, thereby increasing cost of the apparatus. Because of the reason, a problem arises that the image forming apparatus has a very high price. Regarding to the problem, the method of decreasing a frequency of the image clock by employing a laser array in an optical system can be considered. However, in this case, additional hardware costs for controlling the laser or an optical device increase.

SUMMARY

According to a first aspect of the invention, an image processing apparatus includes a contour pixel extraction unit configured to extract a contour pixel component from a bit plane. The bit plane is a set of bits, the number of which is equal to the number of pixels, and each of which is 1 bit of a plurality of bits representing an intensity of each of pixels. Also provided is a connectedness detection unit configured to detect equivalent bits adjacent to each other in a window including a bit corresponding to a target pixel on the bit plane. Also provided is a filter unit configured to reduce an intensity of the target pixel by a reduction amount determined in accordance with the contour pixel component extracted by the contour pixel extraction unit and the equivalent bits adjacent to each other detected by the connectedness detection unit.

According to a second aspect of the invention, an image processing method includes extracting a contour pixel component from a bit plane. The bit plane is a set of bits, the number of which is equal to the number of pixels, and each of which is 1 bit of a plurality of bits representing an intensity of each of pixels. Also provided is detecting equivalent bits adjacent to each other in a window including a bit corresponding to a target pixel on the bit plane. Also provided is reducing an intensity of the target pixel by a reduction amount determined in accordance with the extracted contour pixel component and the detected equivalent bits adjacent to each other.

According to a third aspect of the invention, an image forming apparatus includes a contour pixel extraction unit configured to extract a contour pixel component from a bit plane. The bit plane is a set of bits, the number of which is equal to the number of pixels, and each of which is 1 bit of a plurality of bits representing an intensity of each of pixels. Also provided is a connectedness detection unit configured to detect equivalent bits adjacent to each other in a window including a bit corresponding to a target pixel on the bit plane. Also provided is a filter unit configured to reduce an intensity of the target pixel by a reduction amount determined in accordance with the contour pixel component extracted by the contour pixel extraction unit and the equivalent bits adjacent to each other detected by the connectedness detection unit. Also provided is a selection output unit configured to output a selected signal by determining whether to select an input image signal of a plurality of bits of the target pixel or an output signal obtained by the filter unit, in accordance with a value of the input image signal of the plurality of bits thereof.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

DESCRIPTION OF THE DRAWINGS

The accompanying drawings, which are incorporated in and constitute a part of the specification, illustrate embodiments of the invention, and together with the general description given above and the detailed description of the embodiments given below, serve to explain the principles of the invention.

FIG. 10A is a diagram showing signal arrangement of a contour point determination table.

FIG. 10B is a diagram showing a pixel expression example of "1" represented by a black pixel and "0" represented by a white pixel.

FIG. 10C is a diagram showing contour patterns.

FIG. 18 is a block diagram showing a flow of a processing of selection and resolution conversion.

FIG. 21 is a diagram showing a sequence for acquiring a pulse position after one pixel conversion.

DETAILED DESCRIPTION

Hereinafter, an embodiment of the invention will be described with reference to the accompanying drawings. Furthermore, in this embodiment, application to a digital multi-function device (MFP: Multi Function Peripheral) using an electrophotographic printer will be also described. Engine resolution is set by 1200 dpi for the convenience of description.

Figure 1:
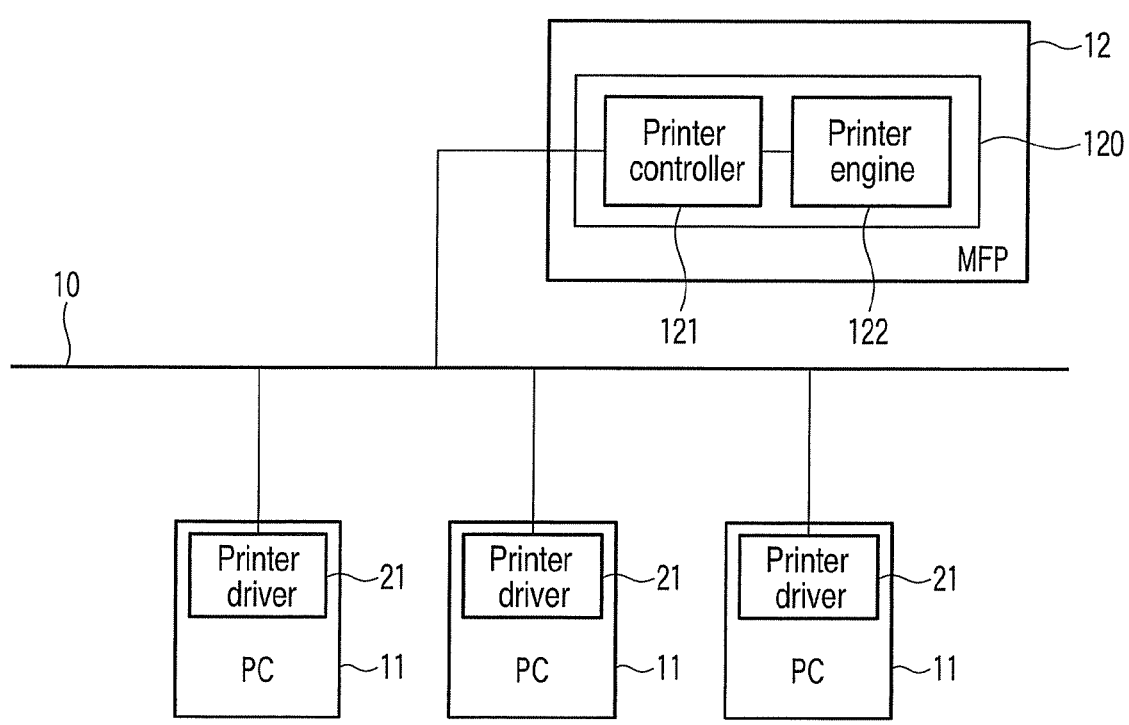
FIG. 1 is a diagram showing a system configuration using an MFP according to an image processing apparatus of the present invention.

FIG. 1 shows a system configuration using a MFP (Multi-Function Peripheral) 12 according to an image processing apparatus of the present invention.

In the system shown in FIG. 1, PDL data that represents the structure of image data is transmitted from an arbitrary personal computer (PC) 11, which is connected to a network 10 that has recently been prevailing with great rapidity, to a printer 120 that is a partial function within the MFP 12. Specifically, the PC 11 is configured to transmit a PDL code or raster data from a printer driver 21 to a printer controller 121 of the printer 120 in accordance with characteristics of interface with the printer 120.

The printer 120 is configured such that the printer controller 121 drives and controls a printer engine 122. The printer controller 121 develops a page description language, such as PDL, which is coded image data from the PC 11, into a bitmap, executes various image processes, and stores the resultant data in a built-in data storage unit. The printer engine 122 converts the bitmap image data from the printer controller 121 to a drive signal, and executes a printing operation, for example, by feeding paper and driving a laser.

Recently, increase in performance of a RIP function in the printer controller 121 is remarkable. Thus, in the printer controller 121, attributes of the objects are analyzed, are subjected to optimal image processings, respectively, and are synthesized to be able to output.

The PC 11 and printer 120 are not necessarily connected over the network, and may be connected by a USB or the like. In addition, the PC 11 and printer 120 may be connected in one-to-one correspondence. The interface between the printer controller 121 and printer engine 122 basically depends on the architecture of the printer, and is not specifically standardized.

Figure 2:
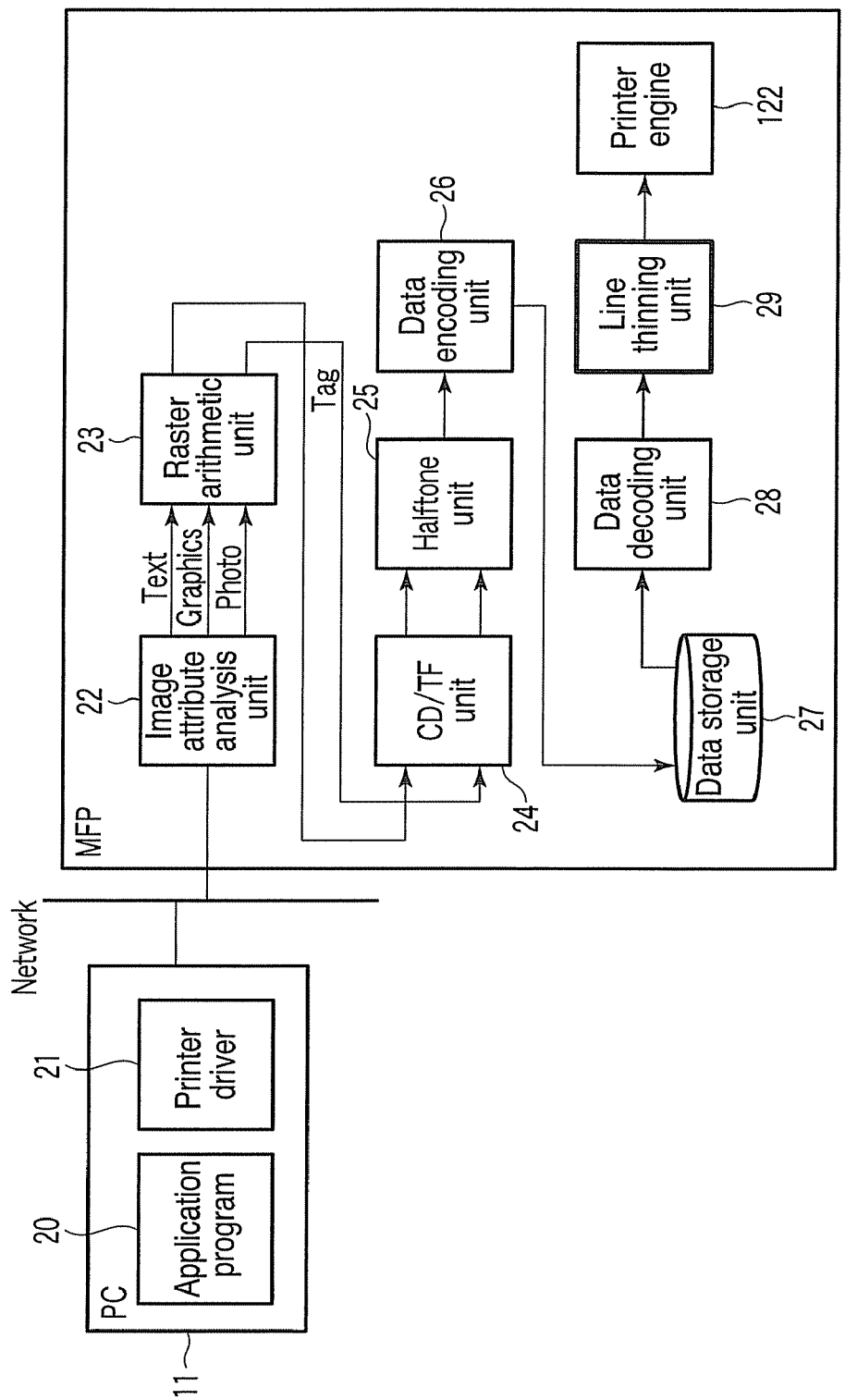
FIG. 2 is a block diagram showing an exemplary configuration of a printer controller within the MFP.

FIG. 2 is a block diagram showing an exemplary configuration of the printer controller 121 within the MFP 12. Specifically, the printer controller 121 includes an image attribute analysis unit 22, a raster arithmetic unit 23, a CD/TF unit 24, a halftoning unit 25, a data encoding unit 26, a data storage unit 27, a data decoding unit 28, and a line thinning unit 29.

The PDL data transmitted from the printer driver 21 by a printing instruction from an application program 20 of the PC 11 is transmitted to the printer controller 121. The image attribute analysis unit 22 in the printer controller 121 analyzes the attribute of the image data on the basis of the PDL code of the received PDL data, and classifies the types of the image data. Basically, a largely classified image data has any one of a text attribute, a graphic attribute, and an image bitmap attribute. The classified data attributes are assigned as tags, respectively, for the subsequent processings. For example, when the image data has the above-mentioned three attributes, 2-bit tag data is necessary.

Subsequently, the raster arithmetic unit 23 converts the PDL code data of the image data to bitmap data. For example, in the case of a monochromatic printer, the code data is converted to single-color 8-bit bitmap data. In the case of a color printer, the code data is converted to 8-bit bitmap data for each color. In this case, to each bitmap data, tag data corresponding to each position is also assigned.

Subsequently, the compressed image data is subjected to γ-conversion for obtaining desirable tone characteristics or image density calibration for engine characteristics of the printer engine 122 in a CD/TF unit 24. The CD/TF unit 24 is able to perform an optimal γ-conversion process on the basis of the tag data by switching the CD/TF process in consideration of image characteristics for every object.

Subsequently, the halftoning unit 25 converts one pixel data into image data having the number of bits and the number of tones appropriate to printing ability of the printer 120, for example, by a halftoning using threshold value matrices. In this embodiment, the one pixel data is converted into image data having 4 levels using 2 bits (hereinafter, it is referred to as 2-bit 4-level) by the halftoning. The halftoning unit 25 is configured to switch the halftoning in consideration of the characteristics of images of respective objects, so that the optimal halftoning can be executed in accordance with the tag data.

The data encoding unit 26 compresses the halftoned image data. Next, the compressed halftoned image data is temporarily stored in the data storage unit 27 such as a memory or a HDD. With such a configuration, it is possible to suppress volume of data for storing in the data storage unit 27, and thus it is possible to improve performance of the whole system. Furthermore, by accumulating data in the data storage unit 27, a function such as electronic sort can be effectively used.

The data decoding unit 28 reads out image data from the data storage unit 27, and decodes the coded image data. The line thinning unit 29 applies the line thinning for saving toner (or for adjusting thicknesses of solid images and lines affected by mechanical dot gain of an electrophotograph) to the halftoned image processed by a multi-level toning. The printer engine 122 converts the finally generated image data to a PWM (Pulse Width Modulation) signal for driving the laser, and forms an image.

Figure 3:
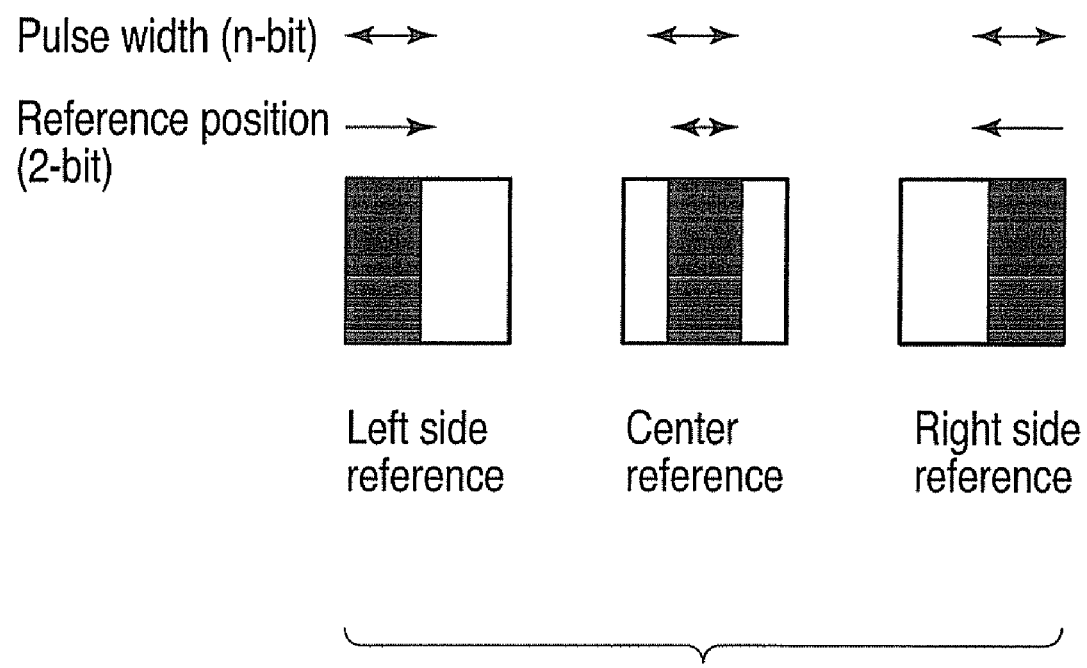
FIG. 3 is a diagram showing a control operation of performing a PWM control on one pixel.

FIG. 3 is a diagram showing a control operation of performing a PWM control on one pixel. In the multi-value PWM, in general, a reference position control signal is internally generated at the same time in addition to the pulse width on the basis of the input image data. When a halftone pixel is printed as shown in FIG. 3, a width of a gray level thereof and a print starting position (the left reference, the right reference, the center reference) are controlled. In general, an image can be formed if the position control signal is set at the left or right. If the print position needs to be controlled with higher precision, the center reference signal is used.

The halftoning unit 25 executes the 2-bit 4-level halftoning using the threshold value matrices. Accordingly, two halftoned bit-planes are generated.

As a line thinning, a method of firstly selecting one arbitrary bit-plane from the two bit-planes and performing the line thinning on a virtual binary image signal constituted of the one bit plane will be described. Furthermore, in the later act of the line thinning, a method of selecting the halftoned image signal and the line thinned image signal, and a method of converting the resultant signal from 1200 dpi in resolution into 600 dpi will be described later.

Figure 4:
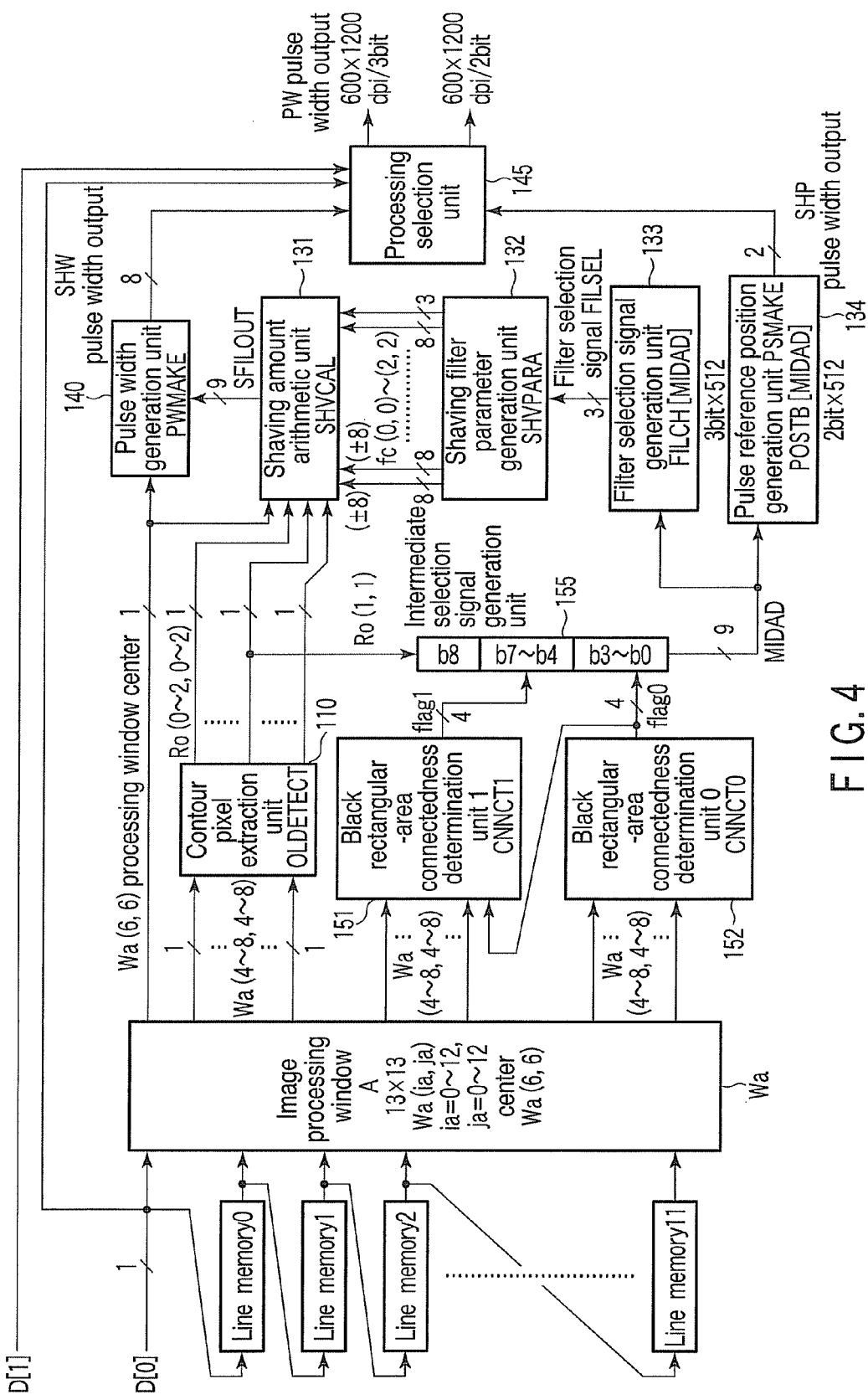
FIG. 4 is a diagram showing a schematic configuration of a line thinning unit.

FIG. 4 is a diagram showing a schematic configuration of the line thinning unit 29.

The line thinning unit 29 includes an image processing window Wa, a contour pixel extraction unit 110, a black rectangular-area connectedness determination unit 151, a black rectangular-area connectedness determination unit 152, a shaving amount arithmetic unit 131, a shaving filter parameter generation unit 132, a filter selection signal generation unit 133, a pulse reference position generation unit 134, a pulse width generation unit 140, an intermediate selection signal generation unit 155, and a processing selection unit 145.

The image processing window Wa is operable to form a reference window having the maximum size of 13×13 pixels. The contour pixel extraction unit 110 is operable to extract contour pixels. The two black rectangular-area connectedness determination units 151 and 152 are operable to determine connectedness of a black rectangular area and to determine whether or not the black rectangular area is adjacent to a boundary. The shaving filter parameter generation unit 132 and the filter selection signal generation unit 133 are constituted of LUTs for generating filter selection signals. The shaving amount calculation unit 131 is constituted of a linear filter for practically calculating a shaving amount. The pulse width generation unit 140 is operable to convert data into an output data format of an apparatus for forming an image such as electrophotograph.

The image processing window Wa outputs a signal to the contour pixel extraction unit 110, the black rectangular-area connectedness determination unit 151, and the black rectangular-area connectedness determination unit 152. The contour pixel extraction unit 110 outputs a signal to the shaving amount arithmetic unit 131. A signal of the pixel centered on the image processing window Wa and a signal from the shaving amount arithmetic unit 131 are output to the pulse width generation unit 140.

The black contour pixel extraction unit 110, the rectangular-area connectedness determination unit 151, and the black rectangular-area connectedness determination unit 152 output signals to the intermediate selection signal generation unit 155. The intermediate selection signal generation unit 155 outputs a signal to the filter selection signal generation unit 133 and the pulse reference position generation unit 134. The filter selection signal generation unit 133 outputs a signal to the shaving amount arithmetic unit 131 through the shaving filter parameter generation unit 132.

The shaving amount arithmetic unit 131 outputs a signal to the pulse width generation unit 140. The pulse width generation unit 140 outputs a signal to the processing selection unit. The pulse reference position generation unit 134 and the pulse width generation unit 140 output signals to the processing selection unit 145. Furthermore, to the processing selection unit 145, a value D[0] of one target pixel, which is the central pixel of the image processing window and is one of two target pixels, and a value D[1] of the other target pixel being adjacent in a scanning direction are input.

[Line Thinning Method]

First, the image processing window Wa will be described. Usually, a two-dimensional image signal is inputted to the image processing window Wa from the outside. However, when the signal is inputted as a one-dimensional signal obtained by scanning the two-dimensional signal, the one-dimensional signal is latched by a plurality of line memories each having a length equal to or above a main scanning width of an image, and this signal is referred as a two-dimensional image signal including a target pixel. That is, the image processing window Wa is an area for referring to the two-dimensional image signal including the target pixel.

In the following embodiments, it is determined that the image processing window Wa is formed by the line memories in case of the one-dimensional signal and an input image in the image processing window Wa can be referred irrespective of a format of a binary input image signal. Further, "1" is a signal level representing a black image of the binary input image signal, and "0" is a signal level representing a white image of the same.

Figure 5:
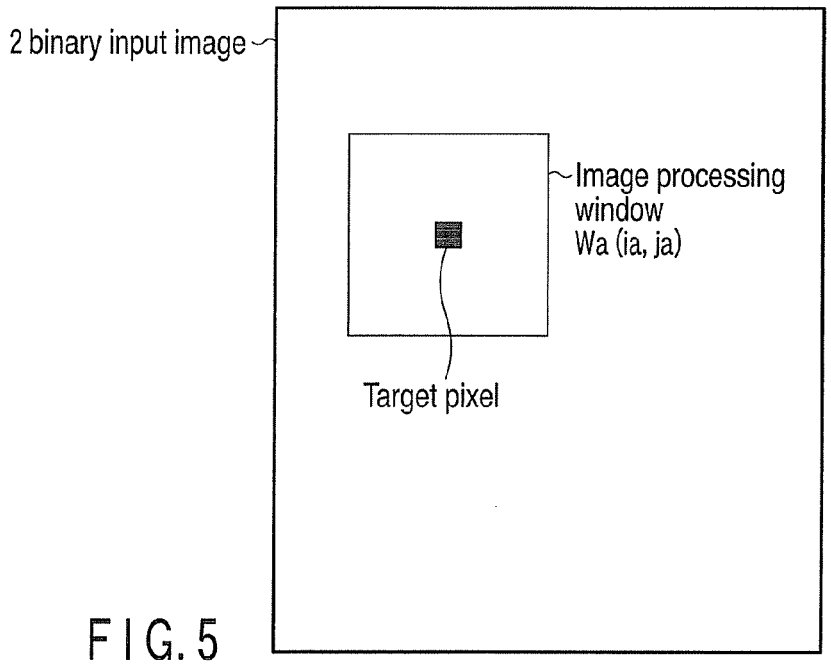
FIG. 5 is a diagram showing a binary input image and an image processing window.
Figure 6:
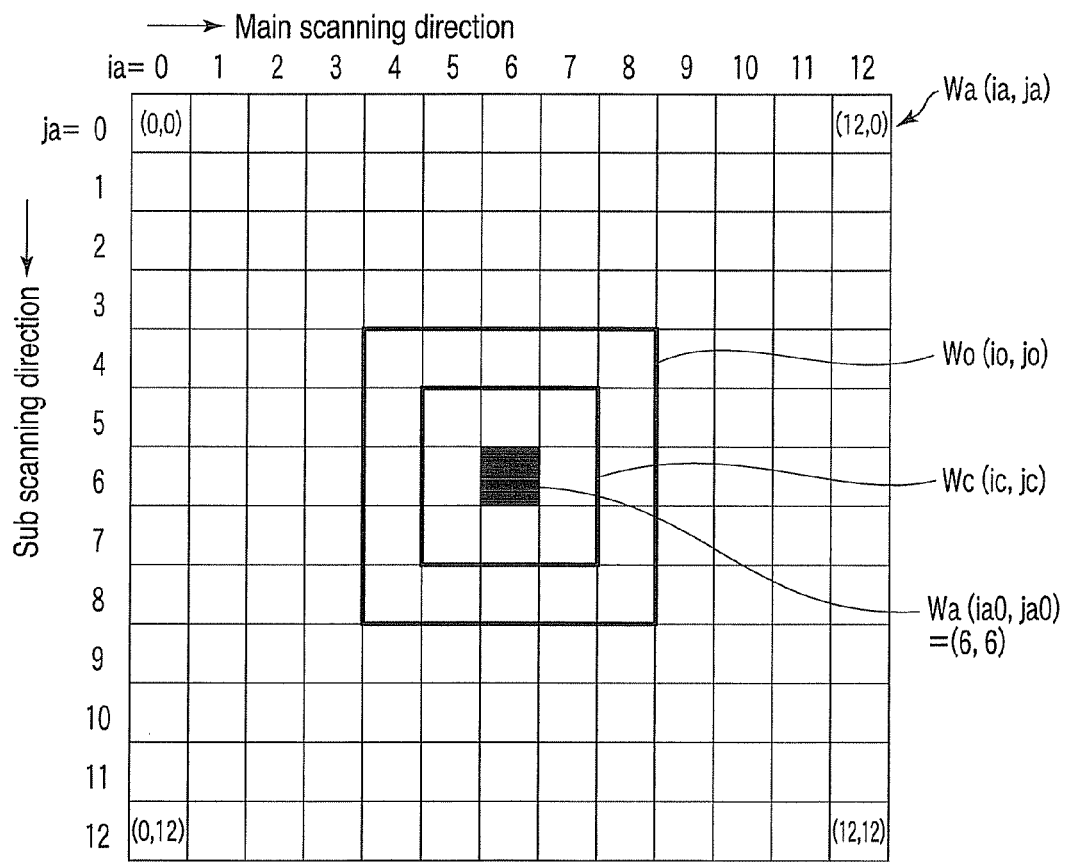
FIG. 6 is a diagram showing an image processing window.

FIG. 5 is a conceptual diagram showing an image processing window Wa (ia, ja). In this image processing window Wa (ia, ja), an input image signal corresponding to an output image signal is referred to as an image processing window central pixel Wa (ia0, ja0). As to the image processing window Wa or the image processing window central pixel, as shown in FIG. 6, it is determined that the image processing window Wa (ia, ja) consists of 13×13 pixels and coordinate expression is ia=0 to 12 (main scanning direction), ja=0 to 12 (sub scanning direction), and the image processing window central pixel Wa (ia0, ja0) is set as Wa (ia0, ja0)=(6, 6), for example.

Figure 7:
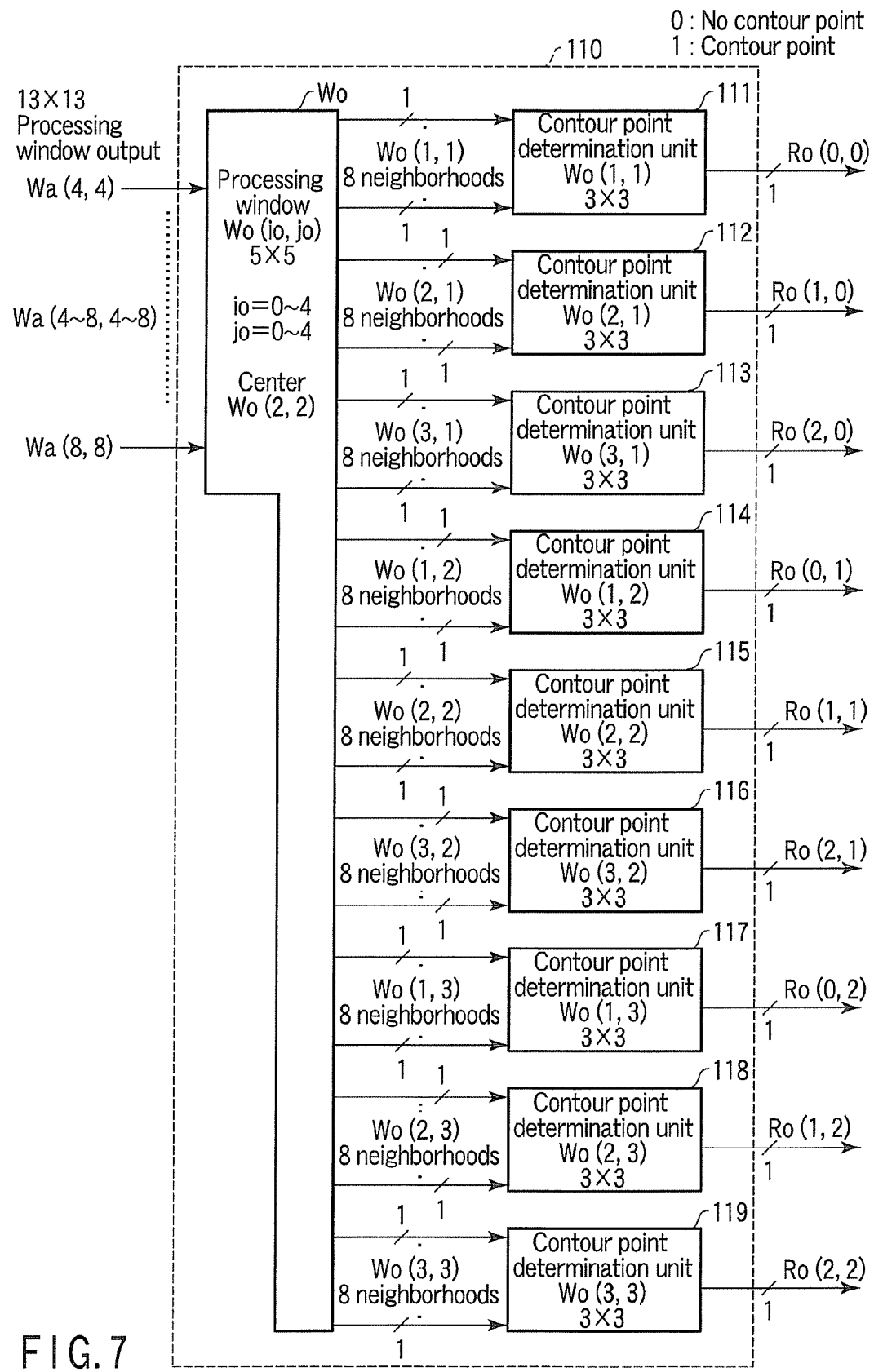
FIG. 7 is a diagram showing a schematic configuration of a contour pixel extraction unit.

The contour pixel extraction unit 110 will now be described. The contour pixel extraction unit 110 executes processing to determine whether the image processing window central pixel Wa (ia0, ja0) is a contour pixel and extracts it. As shown in FIG. 7, this contour pixel extraction unit 110 is constituted by a new processing window Wo (io, jo) used to determine the contour pixel and a plurality of contour point determination units.

Figure 8A:
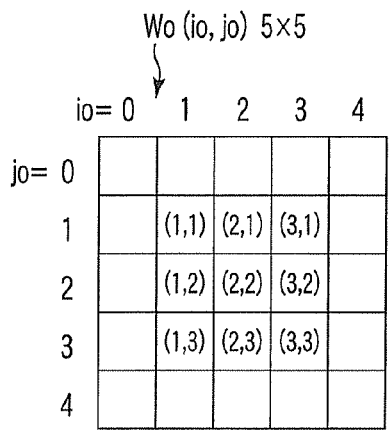
FIG. 8A is a diagram showing a new processing window of the contour pixel extraction unit.
Figure 8B:
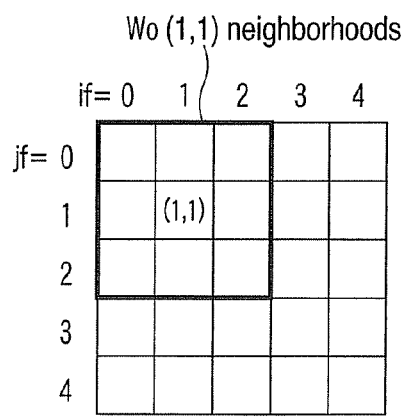
FIG. 8B is a diagram showing a determination area of a contour point determination unit.
Figure 8C:
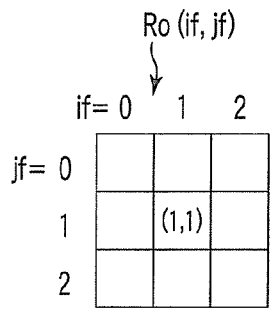
FIG. 8C is a diagram conceptually showing a determination result of the contour pixel extraction unit.
Figure 8D:
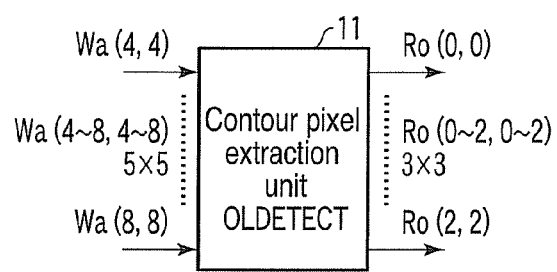
FIG. 8D is a diagram schematically showing signals passing through the contour pixel extraction unit.

Here, description will be given as to a case that a determination is made upon whether eight adjacent pixels plus the image processing window central pixel Wa (6,6), that is, the image processing window Wa (5 to 7, 5 to 7) corresponds to contour pixels. Therefore, the image processing window Wa (io, jo) set as described above and the new processing window Wo (ia, ja) have the correspondence relationship of the following expressions (1) and (2) as shown in FIGS. 6 and 8A.

$$io=0 \text{ to } 4, jo=0 \text{ to } 4 \; Wa(io,jo)=Wo(io+4,jo+4) \quad (1)$$

$$io=4 \text{ to } 8, jo=4 \text{ to } 8 \; Wa(ia,ja)=Wo(ia-4,ja-4) \quad (2)$$

The number of a plurality of the contour point determination units is nine units, which are a contour point determination unit Wo (1, 1) 111 to a contour point determination unit Wo (3, 3) 119 used to determine whether nine pixels of the new processing window Wo (1 to 3, 1 to 3) are contour pixels. Each of the contour point determination unit Wo (1, 1) 111 to the contour point determination unit Wo (3, 3) 119 executes contour determination. Each of these units outputs, as a determination result Ro (if, jf) if=0 to 2, jf=0 to 2, "1" when the pixel is a contour point or "0" when it is not a contour point. Therefore, the new processing window Wo (io, jo) and the determination result Ro (if, jf) have the correspondence relationship which can be represented by the following expression (3).

$$(if, jf)=(io-1, jo-1) \quad (3)$$

For example, as shown in FIG. 7, the contour point determination unit Wo (1, 1) 111 outputs a determination result Ro (0, 0), and the contour point determination unit Wo (3, 3) 119 outputs a determination result Ro (2, 2). That is, as shown in FIGS. 8A to 8D, the contour pixel extraction unit 110 receives 1-bit 5×5 pixels at the new processing windows Wo (io, jo) io=0 to 4, jo=0 to 4, and outputs 1-bit 3×3 pixels of Ro (if, jf) if=1 to 3, jf=1 to 3.

Figure 9:
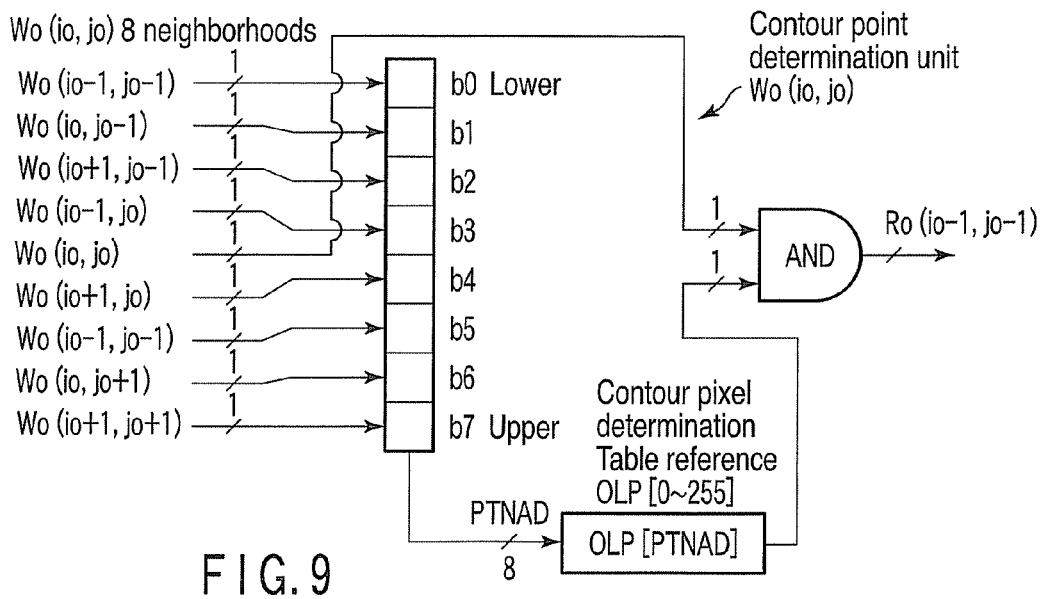
FIG. 9 is a diagram showing a schematic configuration of the contour point determination unit.

FIG. 9 is a diagram showing a schematic configuration of the contour point determination unit Wo (ia, ja). The contour point determination unit Wo (io, jo) (io=1 to 3, jo=1 to 3) receives a target pixel to be determined and its eight adjacent pixels. The inputted eight-adjacent pixel value is converted into an eight-bit address PTNAD of b7 (upper) to b0 (lower). The converted value is determined as an index and a reference is made to a generated contour pixel determination table OLP [0 to 255]. Then, a determination result Ro (io−1, jo−1) of the contour point is obtained by acquiring a logical product with the target pixel to be determined, that is, based on the following expression (4).

$$Ro(io-1, jo-1)=Wo(io, jo) \text{ AND } OLP[PTNAD] \quad (4)$$

As shown in FIG. 10A, data corresponding to the contour pixels stored in the contour pixel determination table OLP is data of a total of nine pixels which are the target pixel and the eight pixels arranged around the target pixel. These pixels are arranged in such a manner that the upper left of the target pixel is associated with b0 of the address PTNAD and the remaining pixels around the target pixel are associated with b1 to b7 of the address PTNAD in the clockwise direction. As shown in FIG. 10B, each piece of data is formed so as to be expressed by black when a determination result is 1 or expressed by white when a determination result is 0. As shown in FIG. 10C, in regard to the data corresponding to the contour pixels, that is, the contour pattern, the contour pattern shown in, for example, FIG. 10C is associated with a predetermined number and stored.

For example, in the case of an address PTNAD=1101 0110b=D6H=214, since this corresponds to the contour pattern of the number 5 in FIG. 10C, the contour pixel determination table OLP is OLP [214]=1. As to an address PTNAD=0000 0000b=00H=0 such as a white background which does not correspond to the contour, since there is no corresponding contour pattern, OLP [0]=0 is obtained.

With the above-described operation, the contour pixel extraction unit 110 outputs to the shaving amount arithmetic unit 131 Ro (if, jf) if=0 to 2, if=0 to 2 which indicates whether the image processing window central pixel Wa (ia0, ja0) and its eight adjacent pixels are the contour pixels.

Subsequently, the black rectangular-area connectedness determination unit 151 and the black rectangular-area connectedness determination unit 152 will be described. Since basic operations of these two units are the same, hereinafter, those will be collectively described as a rectangular-area connectedness determination unit 15.

The rectangular area connectedness determination unit 15 executes the determination of the connectedness with respect to the upper side, the left side, the lower side and the right side of the processing window Wc (ic, jc) cut out from a rectangular shape.

Figure 11:
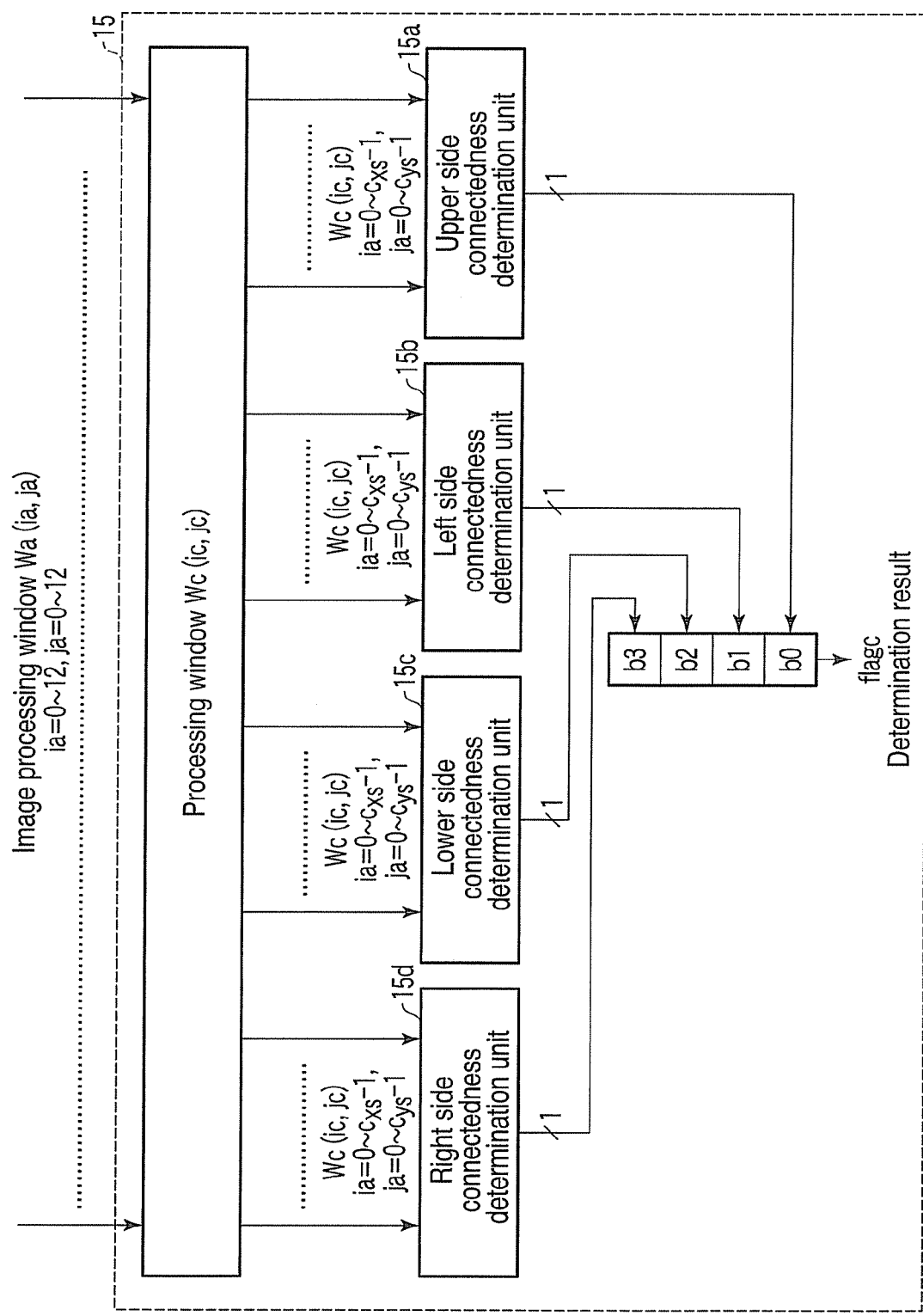
FIG. 11 is a diagram showing a schematic configuration of a rectangular-area connectedness determination unit.

The rectangular area connectedness determination unit 15 is, as shown in FIG. 11, schematically constituted by a processing window Wc (ic, jc), an upper side connectedness determination unit 15a, a left side connectedness determination unit 15b, a lower side connectedness determination unit 15c, and a right side connectedness determination unit 15d.

Figure 12:
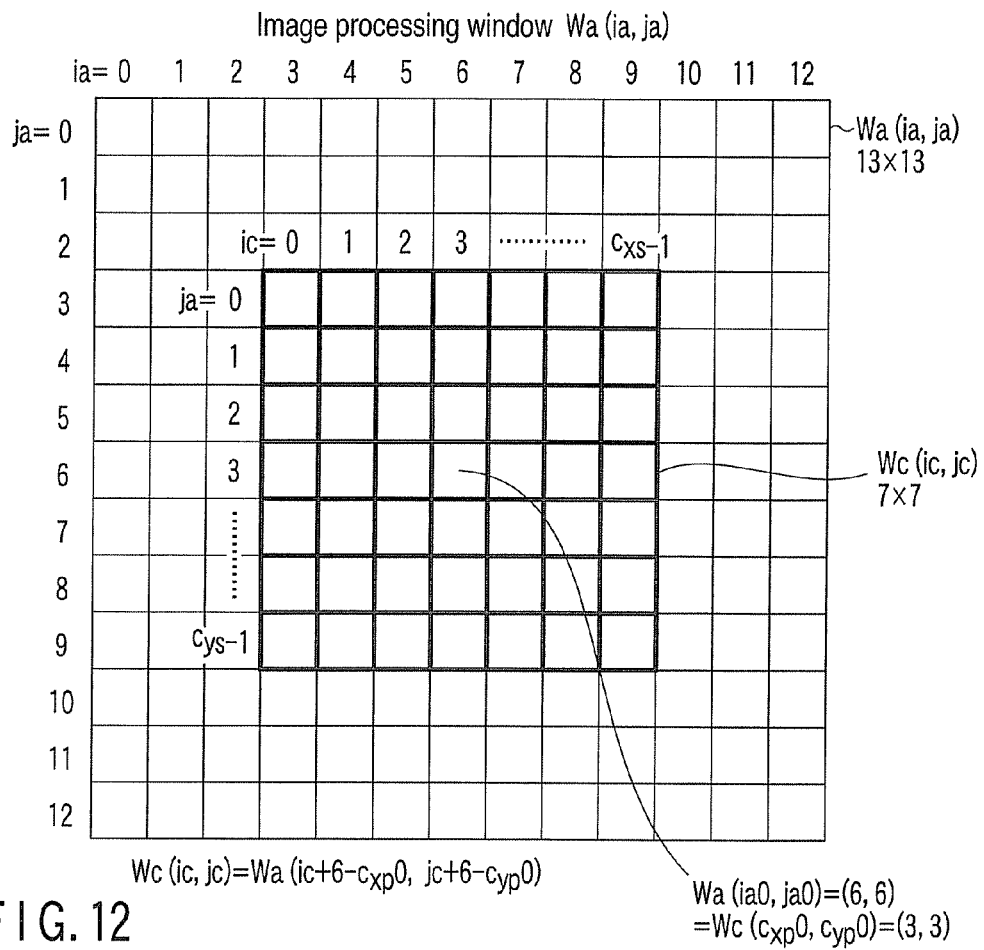
FIG. 12 is a diagram showing a rectangular processing window.

In this embodiment, the processing window Wc (ic, jc) is determined as a rectangular window obtained by cutting out a part of the image processing window Wa (ia, ja), and has $c_{xs}$ pixels in the horizontal direction and $c_{ys}$ pixels in the vertical direction as its size. Further, a central coordinate of the processing window Wc (ic, jc) is determined as $(c_{xp0}, c_{yp0})$, and the processing window is cut out in such a manner that this coordinate matches with the image processing window central pixel Wa (ia0, ja0). That is, the processing window has the relationship of the processing window Wc (ic, jc)=image processing window Wa (ic+ia0−$c_{xp}$, jc+ja0−$c_{yp}$) ic=0 to $c_{xs−1}$, jc=0 to $c_{ys−1}$. FIG. 12 is a conceptual diagram showing the association when the image processing window Wa (ia, ja) has the pixel size of 13×13 and its center (ia0, ja0)=(6, 6) and the processing window Wc (ic, jc) has the pixel size of 7×7 and its center ($c_{xp0}$, $c_{yp0}$)=(3, 3).

The upper side connectedness determination unit 15a presumes that the black pixel area expands to the outside of the upper side of the processing window Wc (ic, jc) (which is referred to as a virtual black pixel area and its area is indicated by slanting lines in the drawing), and determines whether all the black pixel areas in the processing window Wc (ic, jc) include the center ($c_{xp0}$, $C_{yp0}$) and are connected with the virtual black pixel area provided outside the upper side in the vertical direction.

Figure 13A:
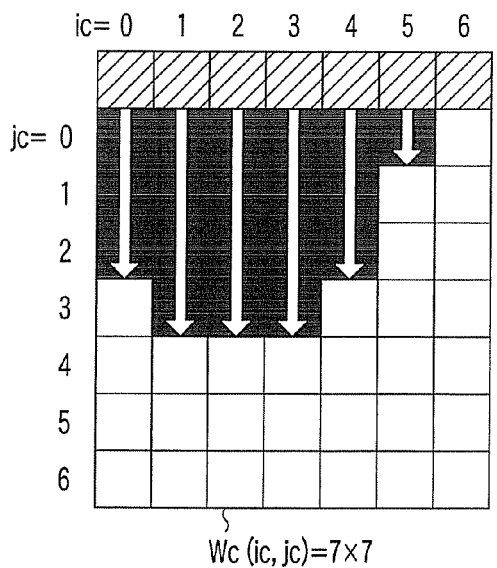
FIG. 13A is a diagram showing an example of an upper side connection of a black pixel area.
Figure 13B:
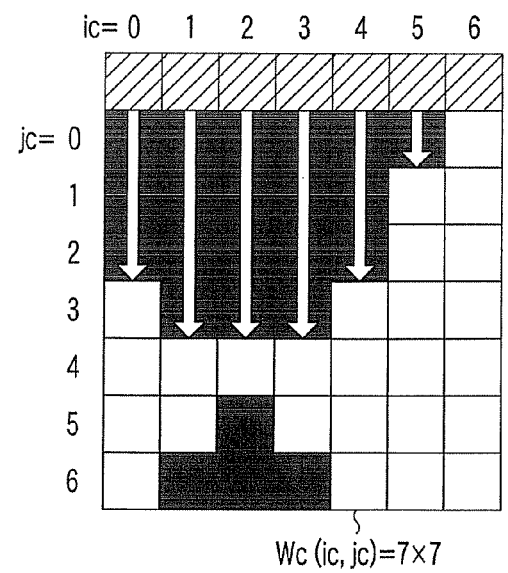
FIG. 13B is a diagram showing an example of an upper side non-connection of a black pixel area.

FIGS. 13A and 13B show concrete examples that the black pixels are connected and not connected to the upper side when the processing window Wc (ic, jc) has the pixel size of 7×7. When the black pixels in the processing window Wc (ic, jc) have a distribution shown in FIG. 13A, all the black pixels in the processing window Wc (ic, jc) are connected with the virtual black pixel area provided outside the upper side in the vertical direction, as indicated by arrows in the drawing. Therefore, the upper side connectedness determination unit 15a determines the connectedness of the upper side. On the other hand, when the black pixels in the processing window Wc (ic, jc) have a distribution shown in FIG. 13B, the black pixels provided near the upper side of the processing window Wc (ic, jc) are connected as indicated by arrows in the drawing, but the black pixels provided near the lower side are not connected to the upper side in the vertical direction. Therefore, the upper side connectedness determination unit 15a determines the non-connectedness of the upper side.

Figure 14:
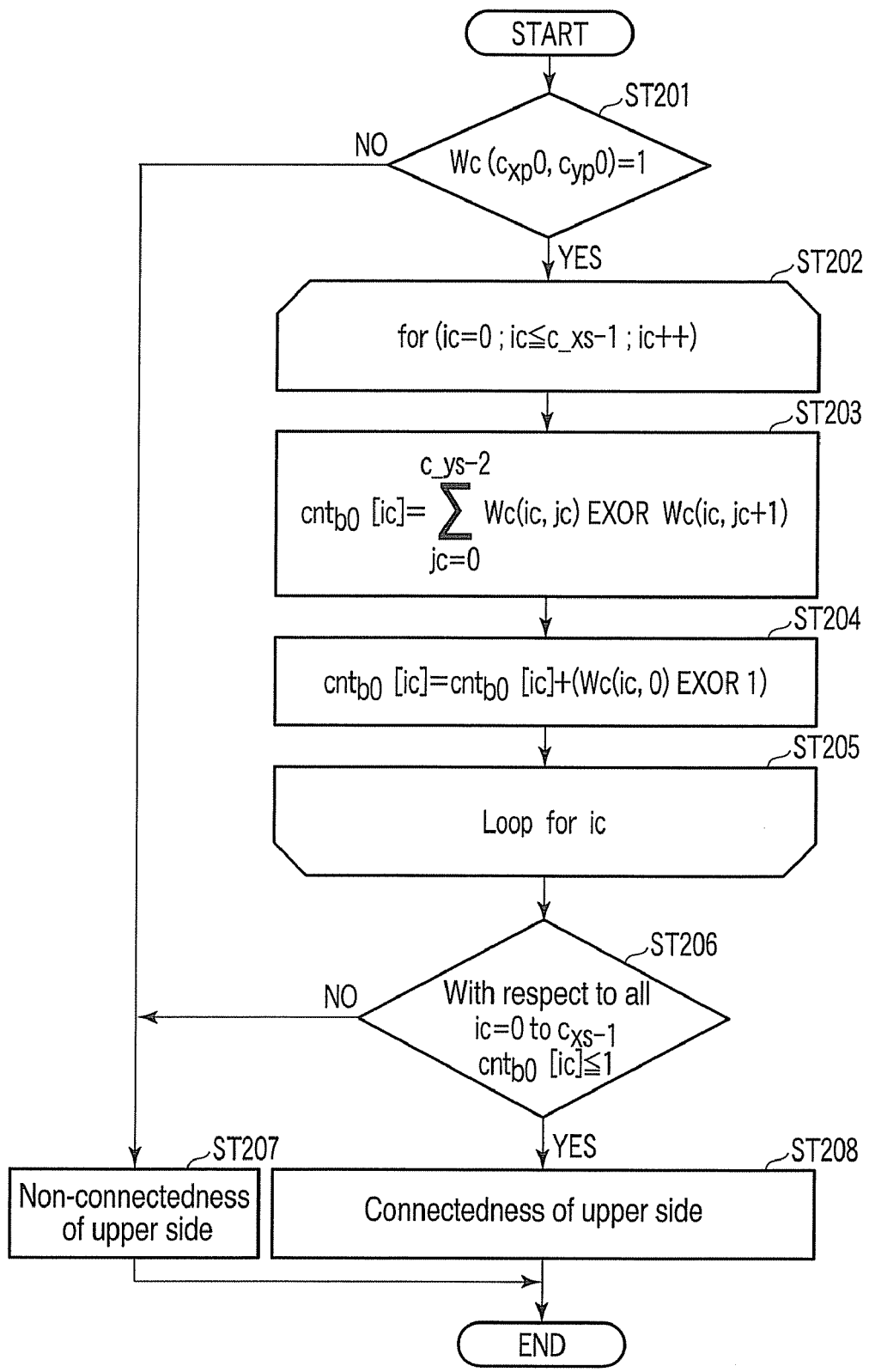
FIG. 14 is a flow chart showing a processing of an upper side connectedness determination unit.

FIG. 14 is a flowchart showing an example of concrete processing to determine the connectedness of the black pixel areas in the upper side connectedness determination unit 15a using $c_{xs}$ counters and a logic OR arithmetic operation.

First, at an act ST201, the upper side connectedness determination unit 15a determines whether the center ($c_{xp0}$, $c_{yp0}$) of the processing window Wc (ic, jc) is "1". If it is determined that the center is not "1", that is, "0 (white image)", since it is an element which does not have to be taken into consideration with respect to the line thinning, the determination unit 151 immediately determines the non-connectedness of the upper side and terminates the processing.

Figure 15A:
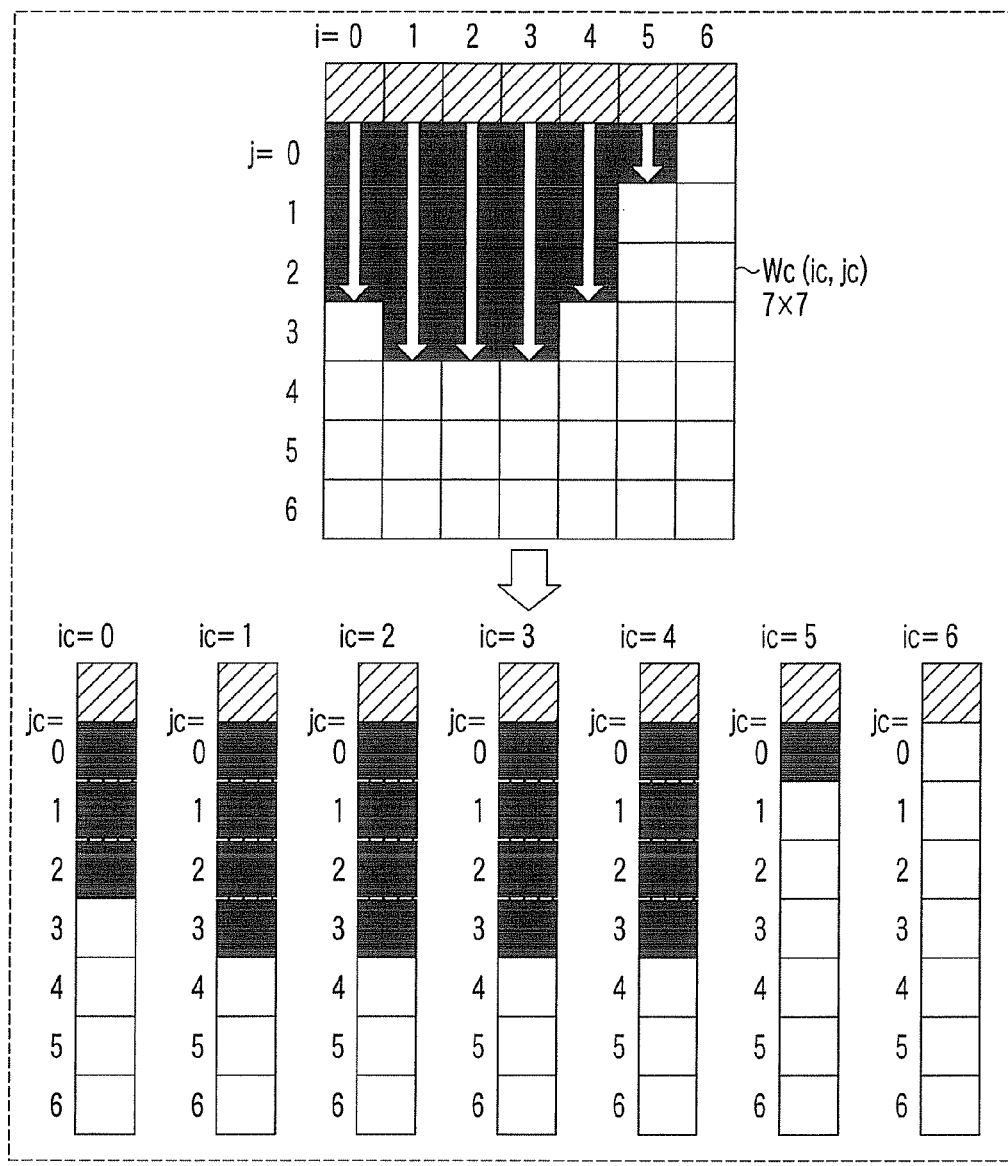
FIG. 15A is a diagram conceptually showing correspondence between a counter and columns of a processing window.
Figure 15B:
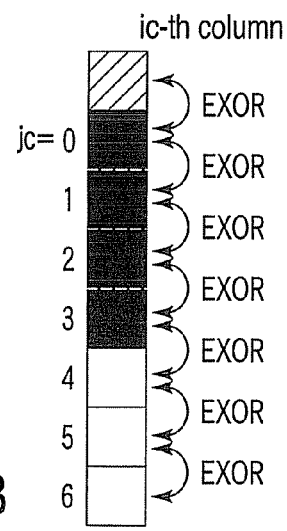
FIG. 15B is a diagram showing calculation of exclusive OR (EXOR) of two pixels adjacent to each other for each column.

Subsequently, at acts ST202 to ST205, the determination unit 15a executes loop processing concerning a counter $cnt_{b0}$[ic] corresponding to each column (ic). The counter $cnt_{b0}$[ic] corresponds to each strip fragmented in accordance with each column shown in a type drawing of FIG. 15A. As shown in FIG. 15B, the determination unit 15a obtains an exclusive OR (EXOR) of two pixels adjacent to each other including a virtual black pixel in each strip, and counts up the counter $cnt_{b0}$[ic] with this result. That is, it counts up with "1" the counter $cnt_{b0}$[ic] corresponding to a case that values of the two adjacent pixels are different from each other, for example, one of the two adjacent pixels in each column is "1" and the other pixel is "0".

At an act ST206, the determination unit 15a determines whether the upper side of the processing window Wc (ic, jc) is connected or not connected. Since the number of times that the exclusive OR becomes 1 in each column is not more than one in case of the connectedness of the upper side, that is, values of all the counters $cnt_{b0}$[ic] are not more than 1, this determination is carried out by checking this.

In this manner, the upper side connectedness determination unit 15a executes the processing to determine whether the black pixel areas are connected or not connected with the upper side. Furthermore, the upper side connectedness determination unit 15a outputs a determination result of 1 bit "1" when the upper side connectedness is determined, and outputs a determination result of 1 bit "0" when the upper side non-connectedness is determined.

Likewise, the left side connectedness determination unit 15b assumes that the black pixels extend to the outside of the left side of the processing window Wc (ic, jc). Then, it determines whether the black pixel areas in the processing window Wc (ic, jc) include the center ($c_{xp0}$, $c_{yp0}$) and all the black pixel areas are connected with the virtual black pixel area provided outside the left side in the vertical direction. As to the concrete processing, it is determined that the processing executed in the upper side connectedness determination unit 15a is carried out at 90 degrees in the counterclockwise direction in the drawing. Moreover, the left side connectedness determination unit 15b outputs a determination result of 1 bit "1" when the left side connectedness is determined, and outputs a determination result of 1 bit "0" when the left side non-connectedness is determined.

Likewise, the lower side connectedness determination unit 15c assumes that the black pixels extend to the outside of the lower side of the processing window Wc (ic, jc). Then, it determines whether the black pixel areas in the processing window Wc (ic, jc) include the center ($c_{xp0}$, $c_{yp0}$) and all the black pixel areas are connected with the virtual black pixel area provided outside the lower side in the vertical direction. As to the concrete processing, it is determined that the upper side connectedness determination unit 15a is performed in the inverted manner. In addition, the lower side connectedness determination unit 15c outputs a determination result of 1 bit "1" when the lower side connectedness is determined, and outputs a determination result of 1 bit "0" when the lower side non-connectedness is determined.

Likewise, the right side connectedness determination unit 15d assumes that the black pixels extend to the outside of the right side of the processing window Wc (ic, jc). Then, it determines whether the black pixel areas in the processing window Wc (ic, jc) include the center ($c_{xp0}$, $c_{yp0}$) and all the black pixel areas are connected with the virtual black pixel area provided outside the right side in the vertical direction. As to the concrete processing, the processing executed in the upper side connectedness determination unit 15a is carried out at 90 degrees in the clockwise direction in the drawing. Then, the right side connectedness determination unit 15d outputs a determination result of 1 bit "1" when the right side connectedness is determined, and outputs a determination result of 1 bit "0" when the right side non-connectedness is determined.

In this manner, as shown in FIG. 11, the determination result of each 1 bit from the upper side connectedness determination unit 15a, the left side connectedness determination unit 15b, the lower side connectedness determination unit 15c and the right side connection determination unit 15d corresponding to four sides of the rectangle are output from the rectangular area connectedness determination unit 15 as a determination result flagc consisting of 4 bits. An output from the upper side connectedness determination unit 15a is the 1st bit (b0) of the determination result flagc. An output from the left side connectedness determination unit 15b is the 2nd bit (b1) of the determination result flagc. An output from the lower side connectedness determination unit 15c is the 3rd bit (b2) of the determination result flagc. An output from the right side connectedness determination unit 15d is the 4th bit (b3) of the determination result flagc.

Furthermore, processing windows Wc (ic, jc) having different rectangular shapes are set to the black rectangular-area connectedness determination unit 151 and the black rectangular-area connectedness determination unit 152, respectively. For example, a processing window Wc1 (ic, jc) having 7×7 pixels is set to the black rectangular-area connectedness determination unit 151, and a processing window Wc2 (ic, jc) having 13×13 pixels is set to the black rectangular-area connectedness determination unit 152. Moreover, the determination unit 151 outputs a determination result flagc1 of the determination upon the connectedness to the intermediate selection signal generation unit 155, and the determination unit 152 outputs a determination result flagc2 of the determination upon the connectedness to the same.

The intermediate selection signal generation unit 155 generates a 9-bit signal MIDAD by connecting the determination result flagc0, the determination result flagc1, and R0 (1, 1) which is 1 bit corresponding to the target pixel.

The filter selection signal generation unit 133 converts the 9-bit signal MIDAD into a 3-bit filter selection signal FILSEL to output the signal to the shaving amount arithmetic unit 131 through the shaving filter parameter generation unit 132. The 3-bit filter selection signal FILSEL corresponds to intensities of filter sets of eight filterings, for example, 0 expressing non-filtering to 7 expressing the strongest filtering.

The pulse reference position generation unit 134 converts the 9-bit signal MIDAD into a 2-bit pulse reference position signal SHP to output the signal to the processing selection unit 145. The 2-bit pulse reference position signal SHP corresponds to "the reference position (2 bits)" shown in FIG. 3, and for example, 0, 1, and 3 expressed by the 2 bits correspond to the left reference, the center reference, and the right side reference, respectively.

Next, the shaving filter parameter generation unit 132 will be described. The shaving filter parameter generation unit 132 outputs a filter coefficient to the shaving amount arithmetic unit 131 by selecting the filter coefficient which is a parameter when the linear filtering operation is executed, on the basis of the filter selection signal FILSEL obtained from the filter selection signal generation unit 133.

The shaving amount arithmetic unit 131 determines a line thinning amount whenever the filter processing is carried out to the determination result Ro (if, jf) if=0 to 2, jf=0 to 2 as to whether or not the eight adjacent pixels of the image processing window central pixel Wa (ia0, ja0) output from the contour pixel extraction unit 110 are contour pixels.

For example, assuming that fc (if, jf) is a filter coefficient which is a parameter when executing a linear filter arithmetic operation, a line thinning amount SFILOUT which is a sum total at an arbitrary (if, jf) is determined based on the following expression (7).

$$SFILOUT = \Sigma fc(if, jf) * Ro(if, jf) \quad (7)$$

The coefficient fc is represented by, for example, the following expressions (8), (9) and (10).

$$fc = \begin{pmatrix} fc(0,0) & fc(0,1) & fc(0,2) \\ fc(1,0) & fc(1,1) & fc(1,2) \\ fc(2,0) & fc(2,1) & fc(2,2) \end{pmatrix} \quad (8)$$

$$= \begin{pmatrix} 0 & 0 & 0 \\ 0 & -1.0 & 0 \\ 0 & 0 & 0 \end{pmatrix}$$

$$fc = \begin{pmatrix} fc(0,0) & fc(0,1) & fc(0,2) \\ fc(1,0) & fc(1,1) & fc(1,2) \\ fc(2,0) & fc(2,1) & fc(2,2) \end{pmatrix} \quad (9)$$

$$= \begin{pmatrix} 0 & -0.25 & 0 \\ -0.25 & -0.25 & -0.25 \\ 0 & -0.25 & 0 \end{pmatrix}$$

$$fc = \begin{pmatrix} fc(0,0) & fc(0,1) & fc(0,2) \\ fc(1,0) & fc(1,1) & fc(1,2) \\ fc(2,0) & fc(2,1) & fc(2,2) \end{pmatrix} \quad (10)$$

$$= \begin{pmatrix} -0.11 & -0.11 & -0.11 \\ -0.11 & -0.12 & -0.11 \\ -0.11 & -0.11 & -0.11 \end{pmatrix}$$

Further, a minimum value filter (MIN), a maximum value filter (MAX), a medium value filter (MED) may be used in some cases. In this case, the line thinning amount SFILOUT can be obtained by the following expressions (11), (12), and (13).

The minimum value relative to an arbitrary $Ro(if, jf)$ can be represented by, $SFILOUT = -MIN(Ro(if, jf))$    (11)

The maximum value relative to an arbitrary $Ro(if, jf)$ can be represented by, $SFILOUT = -MAX(Ro(if, jf))$    (12)

The medium value relative to an arbitrary $Ro(if, jf)$ can be represented by, $SFILOUT = -MED(Ro(if, jf))$    (13)

By using the linear filter arithmetic operation processing relative to the contour pixels in the calculation of a line thinning amount in this manner, it is possible to realize multiple values of the binary image input signal, which is simpler than the complicated conventional technique such as spline interpolation.

The shaving amount arithmetic unit 131 outputs the obtained line thinning amount SFILOUT to the pulse width generation unit 140.

Subsequently, the pulse width generation unit 140 will be described. Then, the pulse width generation unit 140 is able to execute line thinning except for the case where the binary input image is a halftone dot, by adding the line thinning amount SFILOUT, which is output from the shaving amount arithmetic unit 131, to a value of the image processing window central pixel Wa (6, 6) which is the target pixel. Subsequently, a multiplier multiplies the addition result by DTY (multiplier factor used to execute standardization) in order to standardize the addition result to an output signal range, and outputs the obtained result as a line thinned image signal SHW1. That is, SHW1 is obtained based on the following expression (14).

$$SHW1 = (SELOUT + Wa(ia0, ja0)) * DTY \quad (14)$$

For example, if the output signal range is an integer value from 0 to 255, the calculation can be obtained from the following expression (15), and the multiplication result is rounded off to one decimal place.

$$SHW1 = (SELOUT + Wa(ia0, ja0)) * 255 \quad (15)$$

As described above, when determining whether in-area black pixels are connected in a finite area including the target pixel, the sizes of the processing windows Wc (ic, jc) of the black rectangular-area connectedness determination unit 151 and the black rectangular-area connectedness determination unit 152 are appropriately determined taking a size or a line width of halftone dots into account. Then, a filter selection signal FILSEL is generated by converting the signal MIDAD of the intermediate selection signal generation unit 155. Subsequently, a line thinning amount SFILOUT is calculated by using a filter parameter selected on the basis of the filter selection signal FILSEL, and executes the line thinning on the image processing window central pixel Wa which is the target pixel.

Furthermore, the black rectangular-area connectedness determination units 151 and 152 are configured to have different reference window sizes. In this embodiment, it is assumed that a reference window size of the black rectangular-area connectedness determination unit 151 is larger than a reference window size of the black rectangular-area connectedness determination unit 152. Furthermore, in 1200 dpi resolution, the reference window sizes of them are varied with a halftone dot frequency (one hundred and several tens of lines to two hundreds and several tens of lines), a designated line width value, and the like. However, a desirable result is obtained when a reference window size of the black rectangular-area connectedness determination unit 152 is set by an odd number size of 5×5 to 9×9 and a reference window size of the black rectangular-area connectedness determination unit 151 is set by a size of 9×9 to 13×13.

In the processing, a determination method of the connectedness determination unit performs determination by a logical operation such as an exclusive OR (EXOR). Thus, the processing is characterized in that unreasonable increase in circuit size can be prevented like a LUT system which uses a memory and the like even when the processing window increases.

[Resolution Conversion Method]

Hereinafter, a method of selecting the halftoned image signal and the line thinned image signal and a method of converting resolution in the main scanning direction in the final act of the line thinning will be described.

Now will be described the reason why an image selecting and a resolution conversion processing is required when the line thinning is executed on the multileveled image.

In general, in a case of a 1-bit binary halftoned image which is not multileveled, one bit plane is generated. Accordingly, when a line thinning is executed on the bit plane, all halftoned image data is used for the line thinning. Hence, it is possible to intactly output the image signal after the line thinning.

Furthermore, when it is intended to change the image resolution from main1200×sub1200 dpi to main600×sub1200 dpi by using an output device, conversion of resolution of the line thinned image signal into ½ thereof in a main scanning direction may be applied. In this case, by using a basic operation of the resolution conversion, two pixel data in the main scanning direction is converted into one pixel data in order to make the number of pixels in the main scanning direction half. Specifically, the conversion method is changed depending on a PWM control method.

In the embodiment, a pulse reference position signal and a pulse width signal maintaining resolution data are output in accordance with the operation described in FIGS. 3 and 4. In this manner, regardless of whether or not a pixel is processed by the line thinning, it is possible to perform the line thinning while maintaining the basic resolution data. That is, by assuming left and right reference start positions of the pulse reference position signal as resolution data, it is possible to maintain geometrical resolution data.

Meanwhile, when an image is multileveled as described in this embodiment, for example, in a case of a 2-bit 4-level halftoned image, two bit planes are generated. Subsequently, when a line thinning is executed on the multileveled image, an arbitrary one bit plane is selected from the two bit planes, and the line thinning is performed by using a virtual binary image signal constituted of the one bit plane. Therefore, if the line thinning result is intactly output, the other multileveled bit plane data are lost. Thereby, tone data important in tone reproduction is lost.

Accordingly, in this embodiment, tone reproduction is realized by selecting the halftoned image signal and the line thinned image signal. There are various methods in the tone reproduction technique, and there are also employed different techniques such as brightness modulation and area modulation in a monitor, a printer, and the like. In addition, there are also minute differences such as a dispersion system and a concentration system in a printer for performing the tone reproduction by using the area modulation.

In the output device for an electrophotograph and the like, the concentration type halftoning is employed. The reason is that it is hard to perform a stable tone reproduction unless a printing operation is performed to concentrate pixels, that is, toner. The concentration type halftoning is a peculiar tone reproduction technique for the electrophotograph and the like.

Figure 16:
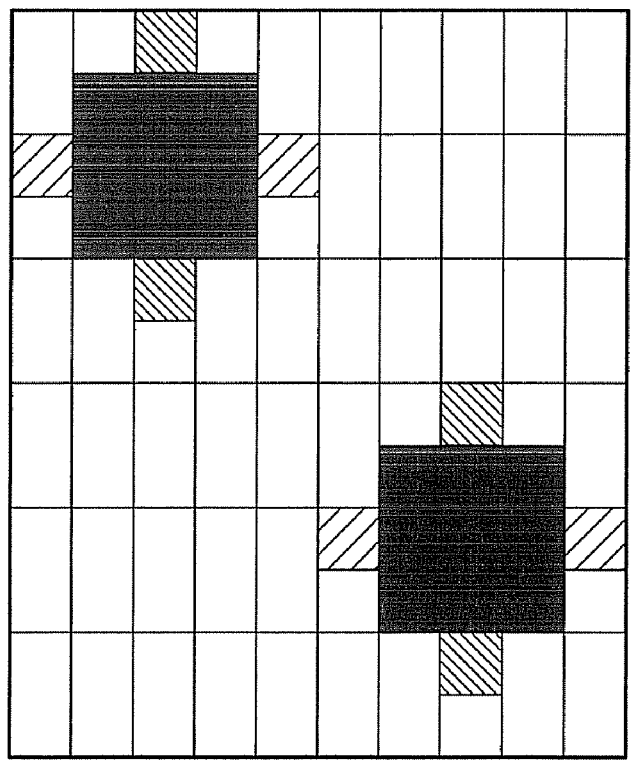
FIG. 16 is a diagram showing an example of a concentration type halftoning.

FIG. 16 is a diagram showing an example of a concentration type halftoning. FIG. 16(a) shows a halftoned image. There are shown two cross-shaped images. In each of the cross-shaped images, a gray scale of the central square is a high level (black), and a gray scale of each of the four small squares arranged around the central square is a medium level (gray). In addition, a gray scale of the background is a low level (white).

FIG. 16(b) is a table representing the 2-bit 4-level cross-shaped image. In the table, a value of the central square is 3, and values of the peripheral small squares are 1 or 2. In addition, a value of the background is 0.

Figure 17B:
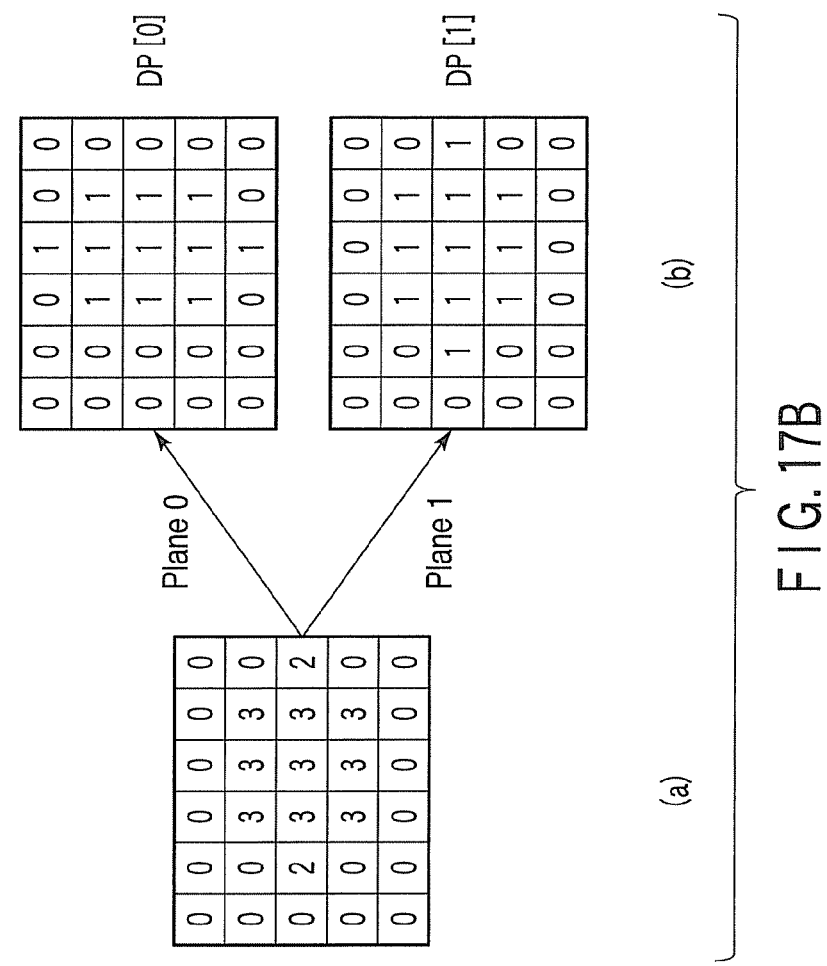
FIG. 17B is a diagram showing an example of a concentration type halftoning.
Figure 17A:
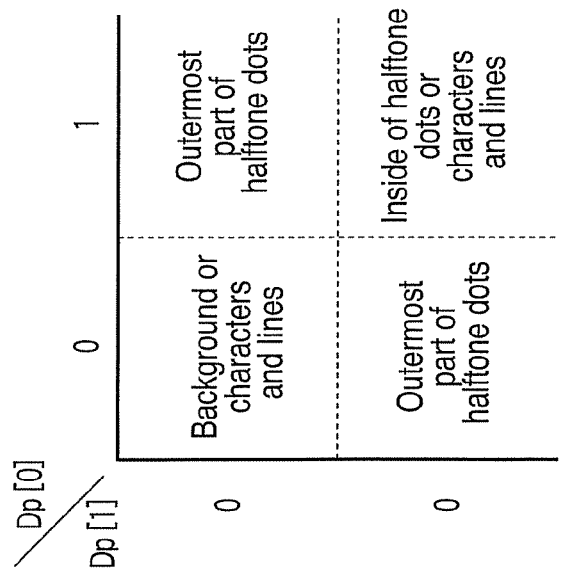
FIG. 17A is a diagram showing an example of a concentration type halftoning.

FIGS. 17A, 17B is a diagram showing an example of a concentration type halftoning. FIG. 17A shows matrices of correspondence between the halftoned values and the image parts regarding the cross-shaped image. In the 2-bit 4-level matrices, the lower bit is determined as Dp[0], and the upper bit is determined as Dp[1]. Thereby, there are generated a bit plane constituted of the lower bits as Dp[0] and a bit plane constituted of the upper bits as Dp[1].

FIG. 17B(a) shows a table representing the cross-shaped image by 2-bit 4 levels. FIG. 17B(b) shows contexts of the two bit planes. Comparing the two bit planes, it can be observed that the two bit planes are similar to each other in bit arrangement. That is, in the concentration type halftoning, although bit planes are different, similarity between the planes is high. Consequently, a different part between different planes correspond to only an outermost part of a full-line image or a halftone-dot image reproduced by toning, and a part of beta and parts of inside structures of halftone dots and full lines are equal to each other.

In the embodiment, by using the characteristics, a method of selecting the halftoned image signal and the line thinned image signal and a method of converting resolution in the main scanning direction will be now described. FIG. 18 is a block diagram showing a flow of a processing of selection and resolution conversion.

First, D[0] and D[1] are acquired as 2-bit data (values of 0 to 3) from the image data of two target pixels. In addition, there are two pixels adjacent to the two target pixels in the main scanning direction.

In the block B01, whether or not the line thinning determination is executed on the basis of two target pixel values is judged by data (bit_fignum) given from the outside. Specifically, if the data value is 1, an output is generated by executing a resolution conversion processing on the basis of the above-mentioned line thinned result in the block B02.

If the data value is 2, a determination processing using two target pixel values obtained after the block B03 is executed. In the block B03, D[0] and D[1] are acquired as 2-bit data (values of 0 to 3) of the two target pixels. In the block B04, if D[0] and D[1] satisfy (0, 0), (0, 3), (3, 0), or (3, 3) (true) by determining the pixel values of the acquired data, an output is generated by executing the resolution conversion processing on the basis of the above-mentioned line thinned result in the block B02. In the determination of the block B04, otherwise (false), an output is generated by executing the resolution conversion processing on the basis of the halftoned result in the block B05.

Furthermore, the determination logic for comparing between the two pixel data depends on output characteristics according to a halftone reproduction technique. Thus, the logic is not limited to this embodiment and may be adaptively changed depending on output characteristics according to the halftone reproduction technique.

Figure 19:
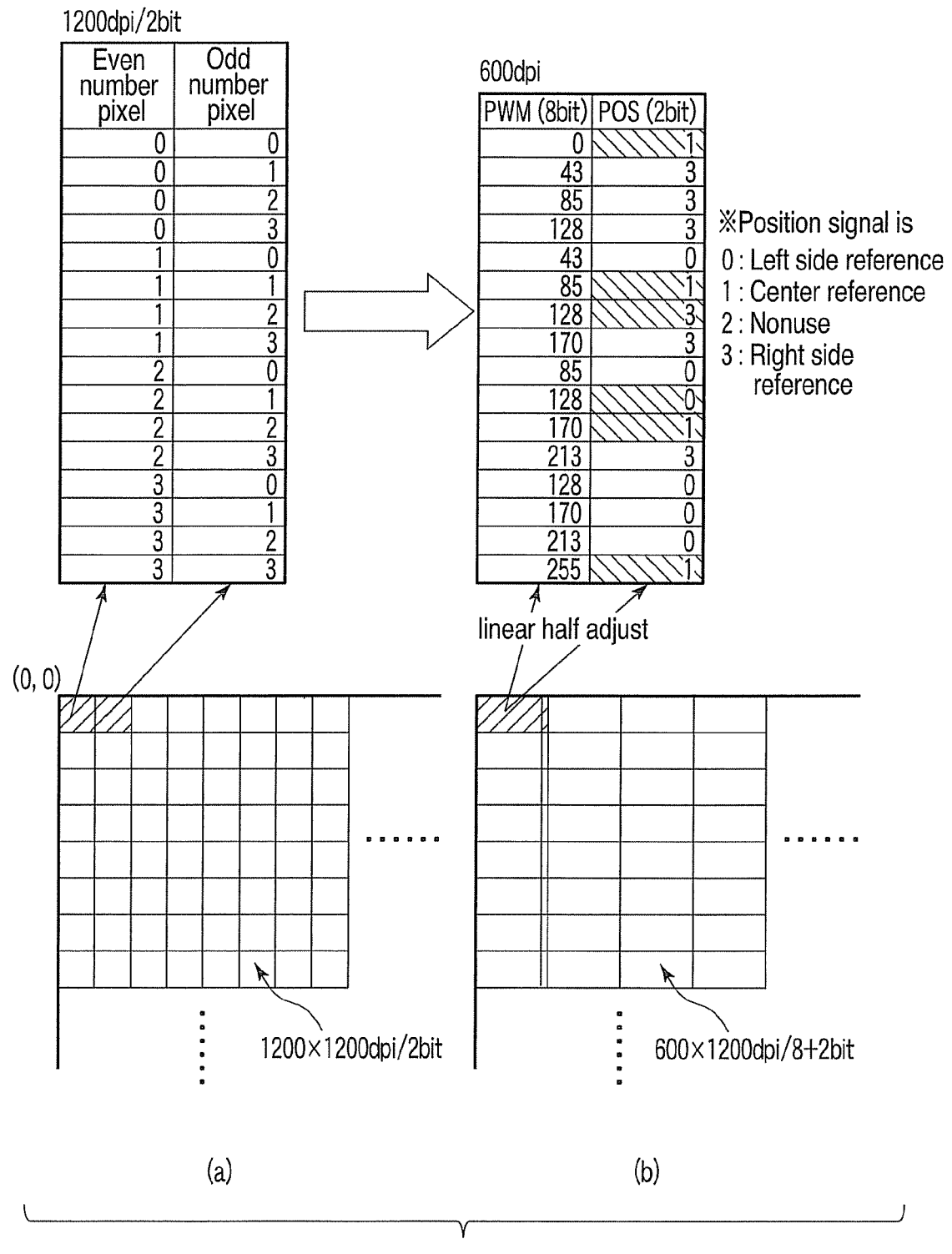
FIG. 19 is a diagram showing an exemplary configuration of the resolution conversion processing.

FIG. 19 is a diagram showing an exemplary configuration of the resolution conversion processing. The lower part of FIG. 19(a) shows a pixel arrangement of 1200×1200 dpi resolution. Here, two pixels in the main scanning direction are collected as one pixel to be converted into a pixel arrangement of 600×1200 dpi resolution shown in the lower part of FIG. 19(b).

In this case, by corresponding to pixel values of two odd number and even number pixels as shown in the upper part of FIG. 19(a), reference positions POS (2 bits) and pulse widths (8 bits) for PWM control are determined as shown in the upper part of FIG. 19(b).

Subsequently, a configuration and an operation of the processing selection unit 145, which is shown in FIG. 4, provided in accordance with the above-described concept will be described. The processing selection unit 145 converts a 1200×1200 dpi image into a 600×1200 dpi image.

The 1200×1200 dpi image may be intactly output to a laser drive unit, but in this case, a drive frequency of the laser drive unit increases, and thus a problem arises that an increase in performance of circuit is required and cost increases. Furthermore, when a multi-bit output such as 8-bit output is generated in the PWM system, data volume increases, and thus a problem arises that circuit cost increases.

Accordingly, the processing selection unit 145 is configured to decrease the drive frequency by converting the 1200×1200 dpi image into the 600×1200 dpi image, and to reduce data volume by using 3-bit output of the PWM system.

Figure 20:
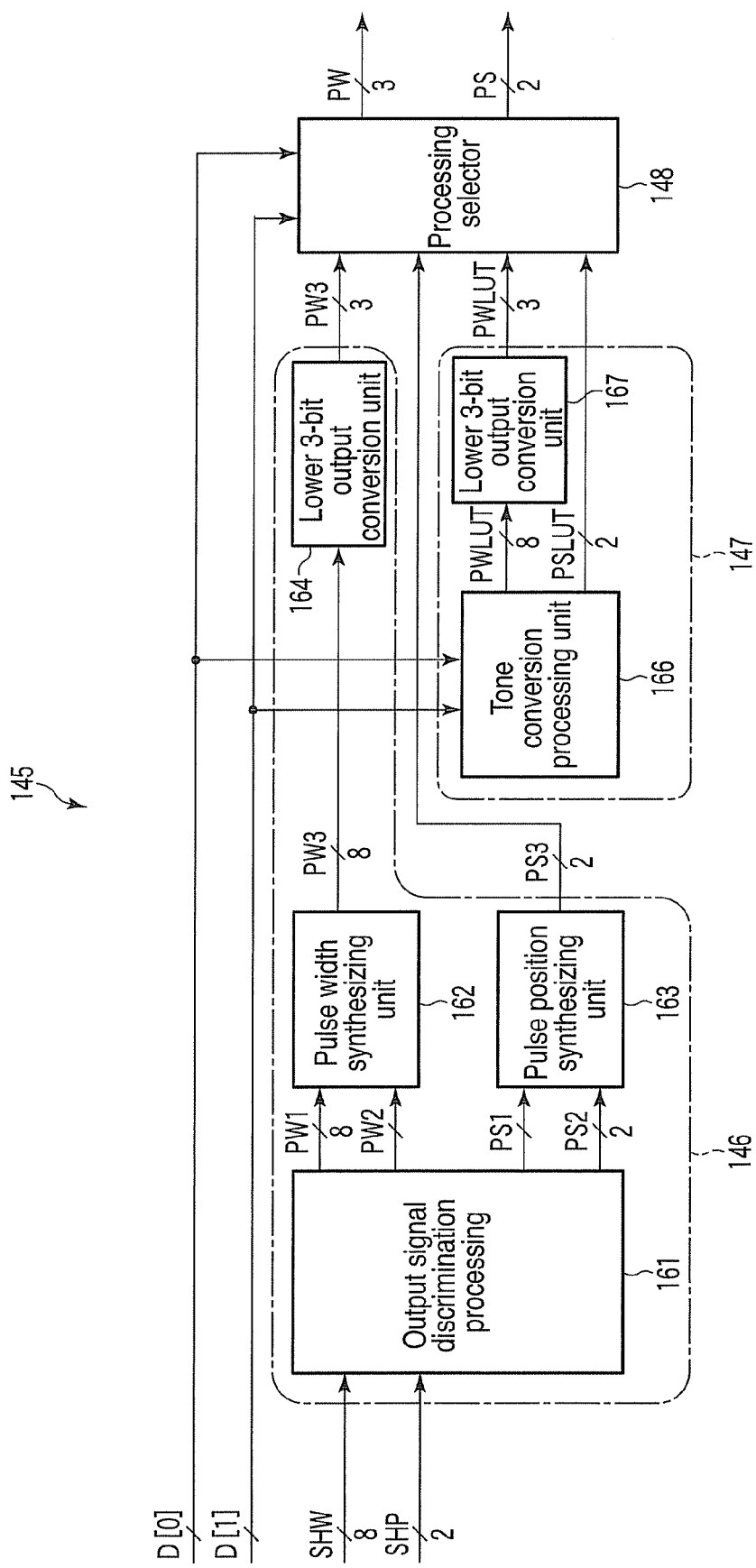
FIG. 20 is a block diagram showing a configuration of a processing selection unit.

FIG. 20 is a block diagram showing a configuration of a processing selection unit 145. The processing selection unit 145 includes a line thinning data processing unit 146, a tone data processing unit 147 and a processing selector 148. The line thinning data processing unit 146 executes resolution conversion processing on data on which is processed by the line thinning. The tone data processing unit 147 executes resolution conversion processing on data which is not processed by the line thinning.

First, a configuration and an operation of the line thinning data processing unit 146 will be now described. The line thinning data processing unit 146 includes an output signal discrimination processing unit 161, a pulse width synthesizing unit 162, a pulse position synthesizing unit 163, and a lower 3-bit output conversion unit 164.

To the line thinning data processing unit 146, a pulse width output SHW (8 bits) is input from the pulse width generation unit 140 shown in FIG. 4 and a pulse position output SHP (2 bits) is input from the pulse reference position generation unit 134. The output signal discrimination processing unit 161 extracts 1200 dpi data being input in series by a unit of two target pixels (per two pixels). Then, the output signal discrimination processing unit 161 outputs two pulse widths PW1 (8 bits) and PW2 (8 bits) to the pulse width synthesizing unit 162. Furthermore, the output signal discrimination processing unit 161 outputs two pulse positions PS1 (2 bits) and PS2 (2 bits) to the pulse position synthesizing unit 163.

The pulse width synthesizing unit 162 acquires a pulse width PW3 (8 bits) after the one pixel conversion based on the following expression (16).

$$PW3 = (PW1 + PW2)/2 \tag{16}$$

In accordance with the sequence shown in FIG. 21, the pulse position synthesizing unit 163 acquires the pulse position PS3 (2 bits) after the one pixel conversion.

Subsequently, the lower 3-bit output conversion unit 164 converts the pulse width PW3 (8 bits) into the pulse width PW3 (3 bits). In the upper part of FIG. 19(b), values of the pulse width PW3 (8 bits) are denoted. From the denoted values, the pulse width PW3 is classified into eight types. Accordingly, when the pulse width PW3 is specified by the classified types, the pulse width is expressed by 3 bits (0 to 7).

According to the processing mentioned above, it is possible to convert the resolution into 600×1200 dpi and reduce output bits of the PWM system.

Next, a configuration and an operation of the tone data processing unit 147 will be described. The tone data processing unit 147 includes a tone conversion processing unit 166 and a lower 3-bit output conversion unit 167.

To the tone data processing unit 147, the pixel values D[0] and D[1] of the two pixels adjacent to each other in the main scanning direction are input. The tone conversion processing unit 166 outputs from the two pixels value a pulse reference position signal PSLUT (2 bits) and a pulse width signal PWLUT (8 bits) of 600×1200 dpi resolution. Furthermore, the lower 3-bit output conversion unit 167 converts the pulse width PWLUT (8 bits) into the pulse width PWLUT (3 bits).

Figure 22:
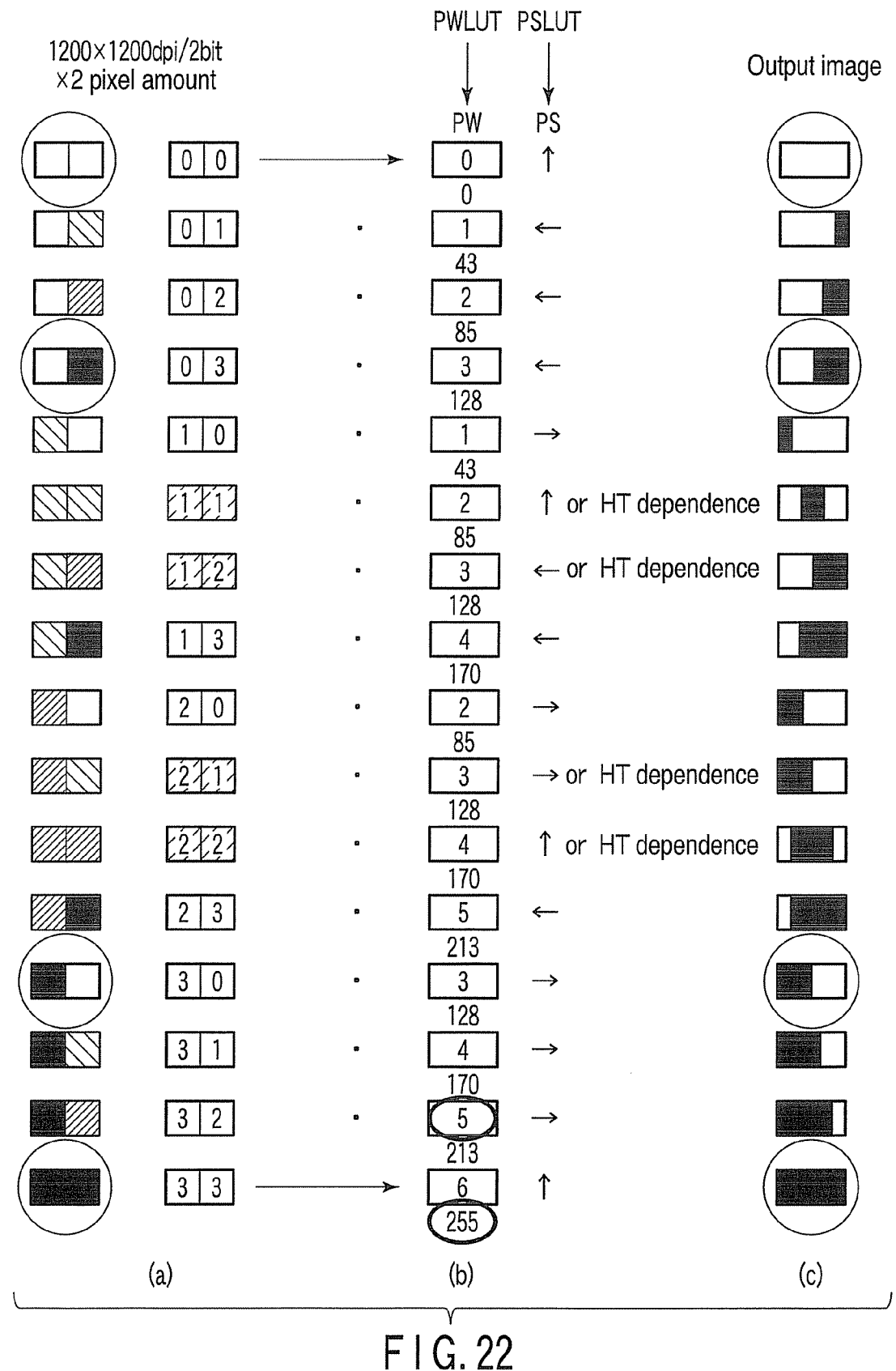
FIG. 22 is a diagram showing an example of the resolution conversion processing.

This conversion method is the same as described in the upper parts of FIGS. 19(a) and 19(b), but the detailed context is shown in FIG. 22. FIG. 22(a) shows the input pixel values D[0] and D[1] of the two pixels together with the image thereof. FIG. 22(b) shows the pulse width signal PWLUT and the pulse reference position signal PSLUT of the conversion result corresponding to the input pixel values D[0] and D[1].

Here, the pulse width signal PWLUT represents two numerals which are a numeral noted in a frame and a numeral noted outside the frame. The numeral outside the frame represents the pulse width signal PWLUT (8 bits) which is an output value of the tone conversion processing unit 166. The numeral inside the frame represents the pulse width signal PWLUT (3 bits) which is converted by the lower 3-bit output conversion unit 167.

FIG. 22(c) shows an output image of a laser printer.

Next, an operation of the processing selector 148 will be described. To the processing selector 148, there are input the pixel values D[0] and D[1] corresponding to the two pixels adjacent to each other in the main scanning direction, the pulse width PW3 and the pulse position PS3 output from the line thinning data processing unit, and the pulse width signal PWLUT and the pulse reference position signal PSLUT output from the tone data processing unit 147.

The processing selector 148 selects any one of a set of the pulse width PW3 and the pulse position PS3 output from the line thinning data processing unit and a set of the pulse width signal PWLUT and the pulse reference position signal PSLUT output from the tone data processing unit 147 in accordance with the pixel values D[0] and D[1], and outputs the selected set as the pulse width PW and the pulse position PS of a laser printer.

This determination logic is the same as described in FIG. 18, but this can be differently described as follows. That is, when the upper bit and the lower bit of the pixel value D[0] are equivalent to each other and the upper bit and the lower bit of the pixel value D[1] are equivalent to each other with regard to pixel values D[0] and D[1] of the two pixels adjacent to each other in the main scanning direction, the set of the pulse width PW3 and the pulse position PS3 from the line thinning data processing unit 146 is output as the set of the pulse width PW and the pulse position PS. Furthermore, when the upper bit and the lower bit of the pixel value D[0] are not equivalent to each other or the upper bit and the lower bit of the pixel value D[1] are not equivalent to each other with regard to pixel values D[0] and D[1] of the two pixels adjacent to each other in the main scanning direction, the set of the pulse width signal PWLUT and the pulse reference position signal PSLUT from the tone data processing unit 147 is output as the set of the pulse width PW and the pulse position PS.

As exemplarily shown in FIG. 16, pixels of which the upper bit and the lower bit are equivalent to each other correspond to a part of beta and parts of inside structures of halftone dots and full lines in the halftoning. Thus, even one bit plane is correlated with another bit plane, and tone data important in tone reproduction is maintained without loss. That is the reason why the determination logic is as described above.

Furthermore, FIG. 20 shows only an example of conversion. However, when execution of resolution conversion in the main scanning direction is previously determined, it may be possible to collectively execute the line thinning and the resolution conversion at the same time.

In addition, in the embodiment, a method of setting the main scan resolution by ½ was described, but not limited to this, for example, conversion of ⅓ (1800 dpi→600 dpi) and ¼ (2400 dpi→600 dpi) is also possible. Furthermore, when a laser printer is also applicable to high resolution, as might be expected, it may be possible to intactly generate an output without changing the main scan resolution.

However, in order to more precisely maintain pure resolution data, it is necessary to care about the PWM control method. For example, it may be preferred that combination of control based on a pulse width signal and a pulse reference position signal change into control means such as a start end control method.

In addition, if some loss of resolution data is allowed, that is, basically, when it has no influence on image quality as a practical output image, all conversion of 1/M may be performed by control based on the pulse width signal and the pulse reference position signal similarly to the embodiment.

Furthermore, in the example, the case of the halftoned 2-bit image signal was described, but not limited to this, a high-quality line thinning can be realized by applying the same logic even when the line thinning is performed on an output processed by a halftoning of multi levels such as 3 bits or 4 bits.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An image processing apparatus, comprising:
a contour pixel extraction unit configured to extract a contour pixel component from a bit plane, the bit plane being a set of bits, the number of the bits being equal to the number of pixels, and each of the bits being 1 bit of a plurality of bits representing an intensity of each of pixels;
a connectedness detection unit configured to detect equivalent bits adjacent to each other in a window including a bit corresponding to a target pixel on the bit plane; and
a filter unit configured to reduce an intensity of the target pixel by a reduction amount determined in accordance with the contour pixel component extracted by the contour pixel extraction unit and the equivalent bits adjacent to each other detected by the connectedness detection unit.

2. The apparatus according to claim 1, further comprising a filter coefficient determination unit configured to determine a filter coefficient of the filter unit on the basis of the contour pixel component extracted by the contour pixel extraction unit and the equivalent bits adjacent to each other detected by the connectedness detection unit,
wherein the filter unit reduces the intensity of the target pixel on the basis of the filter coefficient.

3. The apparatus according to claim 2, further comprising a filter coefficient table configured to store a filter coefficient of the filter unit based on the contour pixel component extracted by the contour pixel extraction unit and the equivalent bits adjacent to each other detected by the connectedness detection unit,
wherein the filter unit reduces the intensity of the target pixel on the basis of the filter coefficient stored in the filter coefficient table.

4. The apparatus according to claim 1, further comprising a selection output unit configured to output a selected signal by determining whether to select an input image signal of a plurality of bits of the target pixel or an output signal obtained by the filter unit, in accordance with a value of the input image signal of the plurality of bits thereof.

5. The apparatus according to claim 4, wherein the selection output unit converts resolution of the selected signal into 1/M (positive number M>1) thereof in a main scanning direction by using a PWM conversion with a pulse width signal and a pulse reference position signal, and outputs the selected signal.

6. The apparatus according to claim 5, wherein the selection output unit converts the number of bits of a signal value of the pulse width signal into a smaller number of bits corresponding to the signal value, and outputs the selected signal.

7. The apparatus according to claim 4, wherein the selection output unit compares a value of the target pixel with a value of a pixel adjacent to the target pixel, determines whether to select the input image signal of the plurality of bits of the target pixel or the output signal obtained by the filter unit, and outputs the selected signal.

8. The apparatus according to claim 7, wherein the selection output unit selects the output signal obtained by the filter unit when an upper bit of the target pixel is the same value as a lower bit thereof and an upper bit of the pixel adjacent to the target pixel is the same value as a lower bit thereof, and outputs the selected signal.

9. An image processing method, comprising:
extracting a contour pixel component from a bit plane, the bit plane being a set of bits, the number of the bits being equal to the number of pixels, and each of the bits being 1 bit of a plurality of bits representing an intensity of each of pixels;

detecting equivalent bits adjacent to each other in a window including a bit corresponding to a target pixel on the bit plane; and reducing an intensity of the target pixel by a reduction amount determined in accordance with the extracted contour pixel component and the detected equivalent bits adjacent to each other.

10. The method according to claim 9, further comprising determining a filter coefficient on the basis of the extracted contour pixel component and the detected equivalent bits adjacent to each other, wherein the intensity of the target pixel is reduced on the basis of the filter coefficient.

11. The method according to claim 10, further comprising storing a filter coefficient by using a filter coefficient table on the basis of the extracted contour pixel component and the detected equivalent bits adjacent to each other, wherein the intensity of the target pixel is reduced on the basis of the filter coefficient stored in the filter coefficient table.

12. The method according to claim 9, further comprising outputting a selected signal by determining whether to select an input image signal of a plurality of bits of the target pixel or an output signal obtained by the reducing of the intensity of the target pixel, in accordance with a value of the input image signal of the plurality of bits thereof.

13. The method according to claim 12, wherein resolution of the selected signal is converted into 1/M (positive number M>1) thereof in a main scanning direction by a PWM conversion with a pulse width signal and a pulse reference position signal, and the selected signal is output.

14. The method according to claim 13, wherein the number of bits of a signal value of the pulse width signal is converted into a smaller number of bits corresponding to the signal value, and the selected signal is output.

15. The method according to claim 12, wherein a value of the target pixel is compared with a value of a pixel adjacent to the target pixel, it is determined whether to select the input image signal of the plurality of bits of the target pixel or the output signal obtained by the reducing of the intensity of the target pixel, and the selected signal is output.

16. The method according to claim 15, wherein the output signal obtained by the reducing of the intensity of the target pixel is selected when an upper bit of the target pixel is the same value as a lower bit thereof and an upper bit of the pixel adjacent to the target pixel is the same value as a lower bit thereof, and the selected signal is output.

17. An image forming apparatus comprising:

a contour pixel extraction unit configured to extract a contour pixel component from a bit plane, the bit plane being a set of bits, the number of the bits being equal to the number of pixels, and each of the bits being 1 bit of a plurality of bits representing an intensity of each of pixels;

a connectedness detection unit configured to detect equivalent bits adjacent to each other in a window including a bit corresponding to a target pixel on the bit plane;

a filter unit configured to reduce an intensity of the target pixel by a reduction amount determined in accordance with the contour pixel component extracted by the contour pixel extraction unit and the equivalent bits adjacent to each other detected by the connectedness detection unit; and a selection output unit configured to output a selected signal by determining whether to select an input image signal of a plurality of bits of the target pixel or an output signal obtained by the filter unit, in accordance with a value of the input image signal of the plurality of bits thereof.

18. The apparatus according to claim 17, further comprising a filter coefficient determination unit configured to determine a filter coefficient of the filter unit on the basis of the contour pixel component extracted by the contour pixel extraction unit and the equivalent bits adjacent to each other detected by the connectedness detection unit, wherein the filter unit reduces the intensity of the target pixel on the basis of the filter coefficient.

19. The apparatus according to claim 18, further comprising a filter coefficient table configured to store a filter coefficient of the filter unit based on the contour pixel component extracted by the contour pixel extraction unit and the equivalent bits adjacent to each other detected by the connectedness detection unit, wherein the filter unit reduces the intensity of the target pixel on the basis of the filter coefficient stored in the filter coefficient table.

20. The apparatus according to claim 17, wherein the selection output unit converts resolution of the selected signal into 1/M (positive number M>1) thereof in a main scanning direction by using a PWM conversion with a pulse width signal and a pulse reference position signal, and outputs the selected signal.

* * * * *